(12) United States Patent
Betrisey et al.

(10) Patent No.: US 6,738,526 B1
(45) Date of Patent: May 18, 2004

(54) METHOD AND APPARATUS FOR FILTERING AND CACHING DATA REPRESENTING IMAGES

(75) Inventors: Claude Betrisey, Redmond, WA (US); Bodin Dresevic, Bellevue, WA (US); John C. Platt, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/364,647

(22) Filed: Jul. 30, 1999

(51) Int. Cl.⁷ .................................................. G06K 9/40
(52) U.S. Cl. ........................ 382/260; 358/1.9; 358/462
(58) Field of Search ................................. 382/254, 260, 382/261, 262, 263, 264, 265, 266; 345/418, 581, 589, 592, 600, 619, 530, 557; 358/1.9, 1.11, 1.16, 445, 462

(56) References Cited

U.S. PATENT DOCUMENTS

| | | | |
|---|---|---|---|
| 4,136,359 A | 1/1979 | Wozniak | 358/17 |
| 4,217,604 A | 8/1980 | Wozniak | 358/16 |
| 4,278,972 A | 7/1981 | Wozniak | 340/703 |
| 5,057,739 A | 10/1991 | Shimada et al. | 313/477 R |
| 5,122,783 A | 6/1992 | Bassetti, Jr. | 340/701 |
| 5,254,982 A | 10/1993 | Feigenblatt et al. | 345/148 |
| 5,298,915 A | 3/1994 | Bassetti, Jr. et al. | 345/149 |
| 5,321,773 A * | 6/1994 | Kopec et al. | 382/209 |
| 5,334,996 A | 8/1994 | Tanigaki et al. | 345/152 |
| 5,341,153 A | 8/1994 | Benzschawel et al. | 345/152 |
| 5,349,451 A | 9/1994 | Dethardt | 358/518 |
| 5,357,580 A * | 10/1994 | Forestieri et al. | 382/128 |
| 5,467,102 A | 11/1995 | Kuno et al. | 345/1 |
| 5,526,477 A * | 6/1996 | McConnell et al. | 345/467 |
| 5,543,819 A | 8/1996 | Farwell et al. | 345/150 |
| 5,548,305 A | 8/1996 | Rupel | 345/150 |
| 5,555,360 A | 9/1996 | Kumazaki et al. | 395/143 |
| 5,590,260 A * | 12/1996 | Morse et al. | 345/467 |

(List continued on next page.)

OTHER PUBLICATIONS

Abram, G. et al. "Efficient Alias–free Rendering using Bit–masks and Look–Up Tables" *San Francisco*, vol. 19, No. 3, 1985 (pp. 53–59).

(List continued on next page.)

*Primary Examiner*—Thomas D. Lee
(74) *Attorney, Agent, or Firm*—Workman Nydegger

(57) ABSTRACT

Methods and apparatus for displaying images, e.g., text characters, on display devices which have multiple separately controllable luminance elements per pixel are described. Multiple alpha values are generated per pixel, e.g., one per pixel sub-component. Filtering is then performed to generate a filtered alpha value for each pixel sub-component. The filtering operation uses as its input multiple alpha values, e.g., 5 per pixel. The alpha values used for the filtering operation may come from neighboring pixels. Accordingly, in the case where character glyphs are combined to form larger images, e.g., text strings, the filtering operation performed on glyph edge pixels depends on the content of a neighboring character glyph. In one embodiment unfiltered alpha values used to represent character glyphs are stored in a glyph cache. After caching, the unfiltered alpha values from multiple glyphs are combined and then the filtering operation is performed. To avoid repeated filtering of character glyphs, in another embodiment, character glyphs are padded along their vertical edges, filtered and then stored in the glyph cache. Glyphs are output from the cache as required and then combined with filtered alpha values corresponding to overlapping image portions being summed. As a result of the summing processes, correct filtered alpha values are generated along glyph edges for the combined image corresponding to multiple glyphs.

56 Claims, 20 Drawing Sheets

U.S. PATENT DOCUMENTS

| | | | | |
|---|---|---|---|---|
| 5,633,654 | A | 5/1997 | Kennedy, Jr. et al. | 345/114 |
| 5,689,283 | A | 11/1997 | Shirochi | 345/132 |
| 5,767,837 | A | 6/1998 | Hara | 345/152 |
| 5,821,913 | A | 10/1998 | Mamiya | 345/88 |
| 5,847,698 | A | 12/1998 | Reavey et al. | 345/173 |
| 5,894,300 | A | 4/1999 | Takizawa | 345/115 |
| 5,914,725 | A * | 6/1999 | MacInnis et al. | 345/441 |
| 5,926,189 | A * | 7/1999 | Beaman et al. | 345/467 |
| 5,949,643 | A | 9/1999 | Batio | 361/681 |
| 5,963,185 | A | 10/1999 | Havel | 345/83 |
| 5,990,903 | A * | 11/1999 | Donovan | 345/432 |
| 6,038,031 | A * | 3/2000 | Murphy | 382/254 |
| 6,104,375 | A * | 8/2000 | Lam | 345/150 |
| 6,188,385 | B1 * | 2/2001 | Hill et al. | 345/136 |

OTHER PUBLICATIONS

Ahumada, A.J. et al. "43.1: A Simple Vision Model for Inhomogenous Image–Quality Assessment" *1998 SID*.

Barbier, B. "25.1: Multi–Scale Filtering for Image Quality on LCD Matrix Displays" *SID 96 Digest*.

Barten, P.G.J. "P–8: Effect of Gamma on Subjective Image Quality" *SID 96 Digest*.

Beck, D.R. "Motion Dithering for Increasing Perceived Image Quality for Low–Resolution Displays" *1998 SID*.

Bedford–Roberts, J. et al. "10.4: Testing the Value of Gray–Scaling for Images of Handwriting" *SID 95 Digest*, pp. 125–128.

Chen, L.M. et al., "Visual Resolution Limits for Color Matrix Displays" *Displays—Technology and Applications*, vol. 13, No. 4, 1992, pp. 179–186.

Cordonnier, V. "Antialiasing Characters by Pattern Recognition" *Proceedings of the S.I.D.* vol. 30, No. 1, 1989, pp. 23–28.

Cowan, W. "Chapter 27, Displays for Vision Research" *Handbook of Optics, Fundamentals, Techniques & Design*, Second Edition, vol. 1, pp. 27.1–27.44.

Crow, F.C. "The Use of Grey Scale for Improved Raster Display of Vectors and Characters" *Computer Graphics*, vol. 12, No. 3, Aug. 1978, pp. 1–5.

Feigenblatt, R.I., "Full–color Imaging on amplitude–quantized color mosaic displays" *Digital Image Processing Applications SPIE* vol. 1075 (1989) pp. 199–205.

Gille, J. et al. "Grayscale/Resolution Tradeoff for Text: Model Predictions" *Final Report*, Oct. 1992–Mar. 1995.

Gould, J.D. et al. "Reading From CRT Displays Can Be as Fast as Reading From Paper" *Human Factors*, vol. 29, No. 5, pp. 497–517, Oct. 1987.

Gupta, S. et al., "Anti–Aliasing Characters Displayed by Text Terminals" *IBM Technical Disclosure Bulletin*, May 1983, pp. 6434–6436.

Hara, Z. et al., "Picture Quality of Different Pixel Arrangements for Large–Sized Matrix Displays" *Electronics and Communications in Japan*, Part 2, vol. 77, No. 7, 1974, pp. 105–120.

Kajiya, J. et al. "Filtering High Quality Text For Display on Raster Scan Devices" *Computer Graphics*, vol. 15, No. 3, Aug. 1981, pp. 7–15.

Krantz, J. et al. "Color Matrix Display Image Quality: The Effects of Luminance and Spatial Sampling" *SID 90 Digest*, pp. 29–32.

Kubala, K. et al. "27:4 Investigation Into Variable Addressability Image Sensors and Display Systems" *1998 SID*.

Mitchell, D.P. "Generating Antiliased Images at Low Sampling Densities" *Computer Graphics*, vol. 21, No. 4, Jul. 1987, pp. 65–69.

Mitchell, D.P. et al., "Reconstruction Filters in Computer Graphics", *Computer Graphics*, vol. 22, No. 4, Aug. 1988, pp. 221–228.

Morris R.A., et al. "Legibility of Condensed Perceptually–tuned Grayscale Fonts" *Electronic Publishing, Artistic Imaging, and Digital Typography*, Seventh International Conference on Electronic Publishing, Mar. 3–Apr. 3, 1998, pp. 281–293.

Murch, G. et al. "7.1: Resolution and Addressability: How Much is Enough?" *SID 85 Digest*, pp. 101–103.

Naiman, A., "Some New Ingredients for the Cookbook Approach to Anti–Aliased Text" *Proceedings Graphics Interface 81*, Ottawa, Ontario, May 28–Jun. 1, 1984, pp. 99–108.

Naiman, A, et al. "Rectangular Convolution for Fast Filtering of Characters" *Computer Graphics*, vol. 21, No. 4, Jul. 1987, pp. 233–242.

Naiman, A.C. "10:1 The Visibility of Higher–Level Jags" *SID 95 Digest* pp. 113–116.

Peli, E. "35.4: Luminance and Spatial–Frequency Interaction in the Perception of Contrast", *SID 96 Digest*.

Pringle, A., "Aspects of Quality in the Design and Production of Text", *Association of Computer Machinery* 1979, pp. 63–70.

Rohellec, J. Le et al. "35.2: LCD Legibility Under Different Lighting Conditions as a Function of Character Size and Contrast" *SID 96 Digest*.

Schmandt, C. "Soft Typography Information Processing 80", *Proceedings of the IFIP Congress* 1980, pp. 1027–1031.

Sheedy, J.E. et al. "Reading Performance and Visual Comfort with Scale to Grey Compared with Black–and–White Scanned Print" *Displays*, vol. 15, No. 1, 1994, pp. 27–30.

Sluyterman, A.A.S. "13:3 A Theoretical Analysis and Empirical Evaluation of the Effects of CRT Mask Structure on Character Readability" (c) *1998 SID*.

Tung, C., "Resolution Enhancement Technology in Hewlett–Packard LaserJet Printers" *Proceedings of the SPIE—The International Society for Optical Engineering*, vol. 1912, pp. 440–448.

Warnock, J.E. "The Display of Characters Using Gray Level Sample Arrays", *Association of Computer Machinery*, 1980, pp. 302–307.

Whitted, T. "Anti–Aliased Line Drawing Using Brush Extrusion" *Computer Graphics*, vol. 17, No. 3, Jul. 1983, pp. 151,156.

Yu, S., et al. "43:3 How Fill Factor Affects Display Image Quality" (c) *1998 SID*.

"Cuttin Edge Display Technology—The Diamond Vision Difference" www.amasis.com/diamondvision/technical.html, Jan. 12, 1999.

"Exploring the Effect of Layout on Reading from Screen" http://fontweb/internal repository/research/explore.asp?RES=ultra, 10 pages, Jun. 3, 1998.

"How Does Hinting Help?" http://www.microsoft.com/typography/hinting/how.htm/fname=%20&fsize, Jun. 30, 1997.

"Legibility on screen: A report on research into line length, document height and number of columns" http://fontweb/internal/repository/research/ scrnlegi.asp?RES=ultra Jun. 3, 1998.

"The Effect of Line Length and Method of Movement on reading from screen" http:/fontweb/internal/repository/research/linelength.asp?RES=ultra, 20 pages.

"The Legibility of Screen Formats: Are Three Columns Better Than One?" http://fontweb/internal/repository/research/scrnformat.asp?RES=ultra, 16 pages, Jun. 3, 1998.

"The Raster Tragedy at Low Resolution" http://www.microsoft.com/typography/tools/trtalr.htm?fname=%20&fsize.

"The TrueType Rasterizer" http://www.microsoft.com/typography/what/raster.htm?fname=%20&fsize, Jun. 30, 1997.

"TrueType fundamentals" http:www.microsoft.com/OTSPEC/TTCHO1.htm?fname=%20&fsize, Jun. 30, 1997.

"TrueType fundamentals" http://www.microsoft.com/OTSPEC/TTCHO1.htm?fname=%20&fsize= Nov. 16, 1997.

"True Type Hinting" http://www.microsoft.com/typography/hinting/hinting.htm Jun. 30, 1997.

"Typographic Research" http://fontweb/internal/repository/research/research2.asp?RES=ultra Jun. 3, 1998.

* cited by examiner

| IMAGE BLOATING RULE TABLE ||
|---|---|
| INTERMEDIATE α VALUE BEFORE BLOATING | INTERMEDIATE α VALUE AFTER BLOATING |
| 1 | 2 |
| 2 | 2 |
| 0 NEXT TO A 2 | 1 |
| 0 NOT NEXT TO A 2 | 0 |

Fig. 17

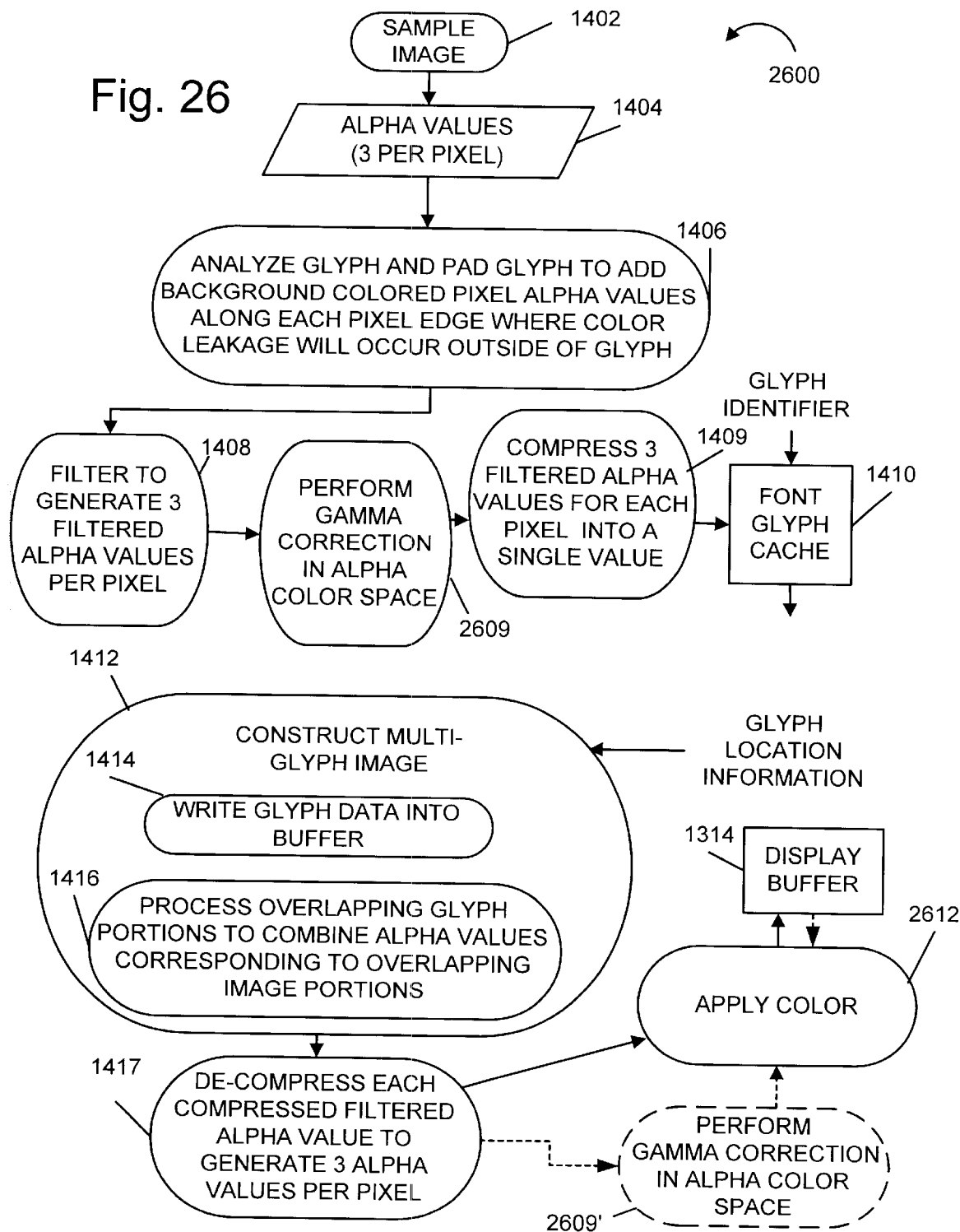

METHOD AND APPARATUS FOR FILTERING AND CACHING DATA REPRESENTING IMAGES

FIELD OF THE INVENTION

The present invention relates to display methods and apparatus and, more particularly, to methods and apparatus for displaying images, such as text on display devices which have multiple separately controllable luminance elements per pixel.

BACKGROUND OF THE INVENTION

The display of images, e.g., text characters, on display devices is of high importance. This is particularly the case given the ever increasing use of computers and other types of devices which rely on displays to convey information.

Pixels are used to represent display images on a display device. The term pixel, which is short for picture-element, is commonly used to refer to one spot in, e.g., a rectangular grid of thousands of spots which can be used to represent an image. Pixels are normally used individually by a computer to form an image on the display device.

Color display devices have become the principal display devices of choice for most computer users. The display of color on a monitor is normally achieved by operating the display device to emit light, e.g., a combination of red, green, and blue light, which results in one or more colors being perceived by a human viewer.

In color displays, the intensity of the light emitted corresponding to the additive primary colors, red, green and blue, can be varied to get the appearance of almost any desired color pixel. Adding no color, i.e., emitting no light, produces a black pixel. Adding 100 percent of all three colors results in white.

In cathode ray tube (CRT) display devices, the different colors of light are generated via the use of phosphor coatings which may be applied as dots in a sequence on the screen of the CRT.

Liquid crystal displays (LCDs), or other flat panel display devices are commonly used in portable computer devices in the place of CRTs. This is because flat panel displays tend to be small and lightweight in comparison to CRT displays. In addition, flat panel displays tend to consume less power than comparable sized CRT displays making them better suited for battery powered applications than CRT displays.

As the quality of flat panel color displays continues to increase and their cost decreases, flat panel displays are beginning to replace CRT displays in desktop applications. Accordingly, flat panel displays, and LCDs in particular, are becoming ever more common.

Unlike CRT displays, LCD displays use square or rectangular light emitters, usually positioned adjacent one another, as the source of red, green and blue light for each pixel. Due to manufacturing limitations with regard to the size of light emitters in LCD displays, it is difficult in an LCD display to achieve the same resolution commonly found in CRT displays.

Unfortunately, the limited resolution provided by commonly used flat panel displays such as LCDs tends to be less than ideal for the display of text. LCD display resolution problems are particularly noticeable when displaying text at small font sizes which are commonly used on personal data assistants and other hand held devices. When the size of a pixel is treated as the smallest unit of size which can be used to represent a position of a character or other image, the relatively large pixel size compared to the character size tends to produce characters with jagged edges.

The use of LCD displays with small characters can also produce less than desirable representations of, e.g., bold text. In the case of bold text it is desirable that bold character stems have stem weights that are 10–20% higher than the corresponding non-bold character stem. At small sizes a character stem may be only one or two pixels in width. Given such stem widths, adjustments in stem weights in one pixel size increments as is commonly done in the art, can lead to far more than the desired 10–20 percent increase in stem weight for bold characters.

FIG. 1 illustrates a known computer system 100 which comprises a housing 101, keyboard 104, disk drive 105 and an LCD display 102. The LCD display comprises a plurality of pixels, two of which are identified by reference numbers 110, 112. Each of the pixels 110, 112 includes separate red (R), green (G) and blue (B) pixel subcomponents which may be controlled as independent luminous intensity sources. In the computer system 100, the R, G and B pixel subcomponents are arranged to for vertical stripes.

In known systems, in the case of text, a high resolution representation of a text character, sometimes referred to as an analytic representation, is normally sampled. The samples are then used to generate luminous intensity values, e.g., red, green and blue pixel sub-component luminous intensity values, which control the light output of the R, G and B pixel sub-components of each pixel, respectively. In conventional systems, the R, G, and B pixel sub-component luminous intensity values are normally generated from the same set of image samples.

FIG. 2 illustrates one known image rendering technique used to control the light output of a set of pixels. In FIG. 2, the grid 220 represents a source image, e.g., a foreground/background color representation of a text character, which has been divided into 9 segments corresponding to 3 rows R(N), R(N+1), R(N+2) and 3 columns C(N), C(N+1), C(N+2) of source image pixel segments. Each one of the 9 segments corresponds directly to one pixel, e.g., pixel 240, of the display screen represented by grid 230. Red, green and blue pixel sub-components 232, 234, 236 are illustrated in FIG. 2 using medium, dark and light speckling, respectively.

In the known image rendering technique, each portion of a source image corresponding to a pixel, referred to herein as a source image pixel segment, is oversampled by a factor of 4 in the vertical and horizontal dimensions. Thus, a set of 16 samples, represented by the circles 222 with x's inside, is generated for each pixel.

The 16 samples corresponding to each pixel segment are then filtered to produce the red, green and blue luminous intensity values used to control pixel sub-components 232, 234, 236. The filtering of the samples is represented by the arrow extending from source image segment 223 to pixel 240. Thus, in the illustrated system, the same portion of the source image is used to generate each of the red, green and blue pixel sub-component luminous intensity values of a pixel. In the known FIG. 2 system, the filtering performed to generate pixel sub-component luminous intensity values does not cross pixel boundaries indicated in the image 220 by the use of solid lines. Accordingly, the luminous intensity of each pixel is not affected by neighboring source image pixel segments. As will be discussed below, this allows different images, e.g., text characters, to be sampled, filtered, stored and then subsequently concatenated without impacting the filtering since the filtering does not depend on neighboring image portions beyond a pixel boundary.

As is known in the art, there are generally two stages associated with the display of text images, e.g., characters, 1) the glyph rendering stage and 2) the glyph display phase. The glyph rendering stage involves the generation of one or more character glyphs and the storage of the glyphs in a glyph cache for subsequent use, e.g., during the display phase. The glyph display phase involves retrieving glyphs from the font cache as need, and, in many cases, combining them prior to display to form text strings.

In the glyph rendering stage one or more character glyphs are rendered, i.e., generated, from corresponding high resolution representations, e.g., outline representations, of the rendered characters. The high resolution character representations from which characters are frequently rendered include character shape and size information. The shape information is frequently in the form of lines, points, curves and/or arcs. Areas within the character outline correspond to the foreground color while areas outside the character outline correspond to the background color.

As part of one known character glyph rendering process, the high resolution representation of the character image from which the glyph is being generated, is sampled multiple times per pixel in both the horizontal and vertical directions as illustrated in FIG. 2. The samples corresponding to each pixel of an image are then filtered, e.g., summed, to perform a filtering operation. The value associated with each pixel resulting from the filtering operation is then stored, along with character spacing information, in a font glyph cache. In the known system one value, referred to as an alpha value, is generated per pixel as a result of the filtering operation.

Alpha values indicate the proportion of the foreground and the background color which contribute to the image area to which the alpha value corresponds. In the known system a single alpha value is generated for each pixel and is used to control the red, green and blue luminous intensity values of the pixel as a function of foreground and background colors which are subsequently applied.

Alpha values are usually normalized to a value in the range of 0–1 before being used in the application of foreground/background colors to a rendered character glyph. In the known system a normalized alpha value of 1 indicates that the region to which the alpha value corresponds is a foreground color region. A normalized alpha value of 0.5 indicates that the foreground and background colors contribute equally to the color of the region corresponding to the alpha value. In addition, a normalized alpha value of 0 indicates that the region to which the alpha value corresponds is a background color region.

In the known system, rendered glyphs, which include character spacing information and one alpha value per pixel, are stored in a glyph cache. The stored alpha values are non-normalized values which are generated by summing the individual samples, having a value of 0 or 1, corresponding to a pixel region.

By storing rendered glyphs in a glyph cache, the known system avoids the need to render a character glyph each time it needs to be displayed, e.g., as part of a text string.

The second phase of rendering text, the glyph display phase, involves reading out glyphs from the glyph cache, applying foreground/background color selections, a gamma correction operation and then outputting the resulting values to a display buffer for storage until being used to control the display device to display the desired character images.

The above described process can be used to generate and display opaque or transparent characters. In the case of opaque characters, a uniform background color is applied. In the case of transparent characters, the background color may vary as a function of the background image over which the characters are placed.

FIG. 3 illustrates one known embodiment of the above described glyph rendering and displaying process as applied to rendering and displaying opaque characters. In FIG. 3, and the various other process diagrams included in the present application, ovals are used to illustrate steps, rectangles are used to illustrate hardware devices, e.g., storage devices, and non-rectangular parallelograms are used to represent data, information, or other values.

The known process 300 begins in step 302 with the sampling of source image pixel segments of a character image. The pixel segments are sampled at a rate of 4× in both the horizontal and vertical directions as illustrated in FIG. 2. The image samples (16 per pixel) 304 are then filtered in step 306 using a box filter to produce a value between 0 and 16 per pixel. Next in step 308, values of 16 are clipped to 15 so that the alpha value for each pixel can be represented using 4 bits. This permits the alpha values to range between 0–15 and allows the alpha values to be stored using 4 bits each as opposed to 5 bits which would be needed for the range 0–16. The alpha values produced by clipping step 308, on per pixel, are stored in the font glyph cache 310 as a glyph corresponding to the sampled image. Multiple character glyphs may be stored in the font glyph cache 310.

The glyph display phase of display text begins with glyphs being output by the glyph cache 310. The output of glyphs is in response to a glyph identifier which identifies the stored glyph to be output.

The alpha values, one per pixel, included in the output glyphs are processed to apply selected foreground and background colors in blending step 312. As part of step 312, the alpha values are normalized to a value between 0 and 1. Foreground and background colors are then applied, to generate R, G, and B luminous intensity values, on a per pixel according to the following equation:

$$R = \alpha R_F + (1-\alpha) R_B$$

$$G = \alpha G_F + (1-\alpha) G_B$$

$$B = \alpha B_F + (1-\alpha) B_B$$

Note that foreground and background colors are specified as gamma corrected values, i.e., values which have been processed to take into consideration the non-linear response characteristics of a display device. Before use in the color blending operation 312, the gamma corrected foreground and background colors are inverse gamma corrected in steps 311 and 312 to produce the foreground and background luminous intensity values used in the color blending process.

The R, G, B foreground and background luminous intensity values used for blending are indicated through the use of an F subscript for a foreground value and a B subscript for a background value.

The generated luminous intensity values are gamma corrected in step 314 prior to being stored in the display buffer 316. Gamma correction is a well known process for adjusting luminous intensity values to take into consideration the non-linear nature of the light output of a display device in response to voltage control signals.

FIG. 4 illustrates another embodiment of the known process for rendering and displaying opaque glyphs. In the FIG. 4 process 400, a pre-computed look-up table 402 is used to perform a combined color application and gamma correction procedure. A different look-up table 402 is used for each supported set of foreground/background colors. The look-up table 402 receives as its input one four bit alpha value per pixel and outputs one set of R, G, B values for each alpha value supplied thereto.

FIG. 5 illustrates a known process 500 for rendering and displaying transparent glyphs. In the FIG. 5 embodiment, gamma correction is performed in the alpha color space in step 502 on the alpha values output by the font glyph cache 310. The gamma corrected alpha values are then supplied to compositing step 504. Since gamma correction is performed in alpha space inverse gamma correction operations need not be performed on the foreground/background color values prior to color blending. Compositing step 504 is responsible for performing color blending using a fixed foreground color and a background color obtained from a background image. Accordingly, in the process 500, background image data is retrieved, on a per pixel basis, from the display buffer 516 in compositing step 504 for color blending purposes. The background information is retrieved from the pixel location in the display buffer 516 corresponding to the image location of the pixel being prepared for display. The R, G, B luminance values produced for each pixel are stored in the display buffer 516 at locations indicated by the glyph location information supplied to compositing step 504.

While the known text display methods work satisfactorily in many applications, as discussed above, in the case of LCD displays and small display sizes, images can suffer from blur, jaggedness, and other problems due to a lack of resolution. This is due, in part, to the fact that pixels are treated as single entities in most known image display processes.

In view of the above remarks, it is apparent that there is a need for new and improved display methods and apparatus. It is desirable that at least some of the new methods and apparatus be capable of displaying small size text on LCDs at reasonable quality levels. It is also desirable that some of the new methods and apparatus be capable of displaying text in a computationally efficient manner allowing for the use of lower cost processors than might otherwise be required.

SUMMARY OF THE PRESENT INVENTION

The present invention relates to methods and apparatus for displaying images, e.g., text characters, on display devices which have multiple separately controllable luminance elements per pixel.

In accordance with the present invention, pixel sub-components are treated as individual luminous intensity sources which can be separately controlled to represent different portions of a source image. As part of the display process of the present invention, high resolution representations of images, e.g., outline representations of text characters to be displayed, are super-sampled. Sets of samples corresponding to different but potentially overlapping image portions are then used to control the light output of individual pixel sub-components of each pixel. The samples, in the set of samples used to control each pixel sub-component are filtered, e.g., summed, to generate a filtered alpha value corresponding to a pixel sub-component. In this manner, a set of filtered alpha values, one for each pixel sub-component of a pixel is generated.

Foreground and background color is applied to each pixel sub-component through the use of alpha blending techniques.

The filtering step uses, in various implemented embodiments, alpha values from adjacent source image pixel segments. This can complicate the filtering process since the content of a neighboring pixel can be dependent at glyph boundaries on the content of a neighboring character glyph.

In one embodiment, non-filtered alpha values are stored in a glyph cache. When character stings are to be generated, the cached glyph data is output from the cache and then filtered. In such an embodiment, the filtering of the alpha values occurs after the glyphs are combined. Accordingly, in such an embodiment, alpha values from neighboring glyphs are available at filtering time. Thus, in the post cache filtering embodiment, color leakage across pixel boundaries does not present a problem.

In other embodiments, the alpha values used to represent a character glyph are filtered prior to the glyph being stored in the glyph cache. In such embodiments, the alpha values from neighboring glyphs are not available at the time of filtering since the neighboring glyph remains undetermined. In such an embodiment, it is not possible to take into consideration the effect of neighboring glyphs on the glyph being filtered at the time of filtering.

To address the effect of neighboring glyphs on filter output values, in one embodiment, glyphs are padded prior to filtering to add one or more background color pixel sub-components at the points along the glyph vertical edges where color leakage might occur from the character glyph as a result of filtering.

Subsequent to filtering, the padded glyphs are stored in the glyph cache. In such a pre-cache filtering embodiment, when padded glyphs are output from the glyph cache and combined to represent a text string, filtered alpha values corresponding to overlapping image portions are summed. The resulting filtered alpha values are identical to those which would have resulted if the pre-filtering alpha values of adjacent character glyphs were combined and then filtered.

The pre-glyph cache filtering embodiment allows glyphs to be filtered once, e.g., prior to storage in the glyph cache with a minimal amount of processing, e.g., summing of alpha values, then being required to patch the edges of glyphs which are combined to form larger images. Thus, the repeated filtering of the entire contents of a glyph each time the glyph is output from the glyph cache, is avoided with the pre-cache glyph filtering embodiment of the present invention.

Methods and apparatus for efficiently darkening characters which may otherwise appear too light or gray, due to thin stem widths, are also described. The described methods involve bloating character images of particular fonts with which the gray problem due to thin stems is associated. The bloating operation may be selectively implemented as part of a filtering look-up table operation. Such an approach to resolving the gray character problem avoids the need to modify hinting rules or modify the character font file from which the character images are generated.

Additional features, embodiments and benefits of the methods and apparatus of the present invention are discussed in the detailed description which follows.

BRIEF DESCRIPTION OF THE DRAWINGS

FIG. 17 illustrates an image bloating rule table of the present invention.

FIG. 26 illustrates a process for displaying character images which involves the use of pre-glyph cache filtering of character glyphs and the application of gamma correction in the alpha color space.

DETAILED DESCRIPTION

As discussed above, the present invention is directed to methods and apparatus for displaying images, e.g., text, on display devices which have multiple controllable luminance elements, e.g., pixel sub-components, per pixel.

The present invention treats pixel sub-components as independent luminous intensity sources which may be used to represent an image. In accordance with the present invention, different portions of a source image, e.g., a high resolution representation of a text character, are used to control different pixel sub-components of a pixel. In this manner, improved resolution is achieved when displaying images with separately controllable pixel sub-components. While using different portions of a source image to control each pixel sub-component of a pixel may introduce some color errors since humans are considerably more sensitive to light intensity than color, the trade off between increased resolution at the expense of decreased color accuracy can provide significant display benefits. The benefits are particularly noticeable when displaying text at small sizes which is frequently the case in hand-held devices and portable computer applications.

Figure 6:
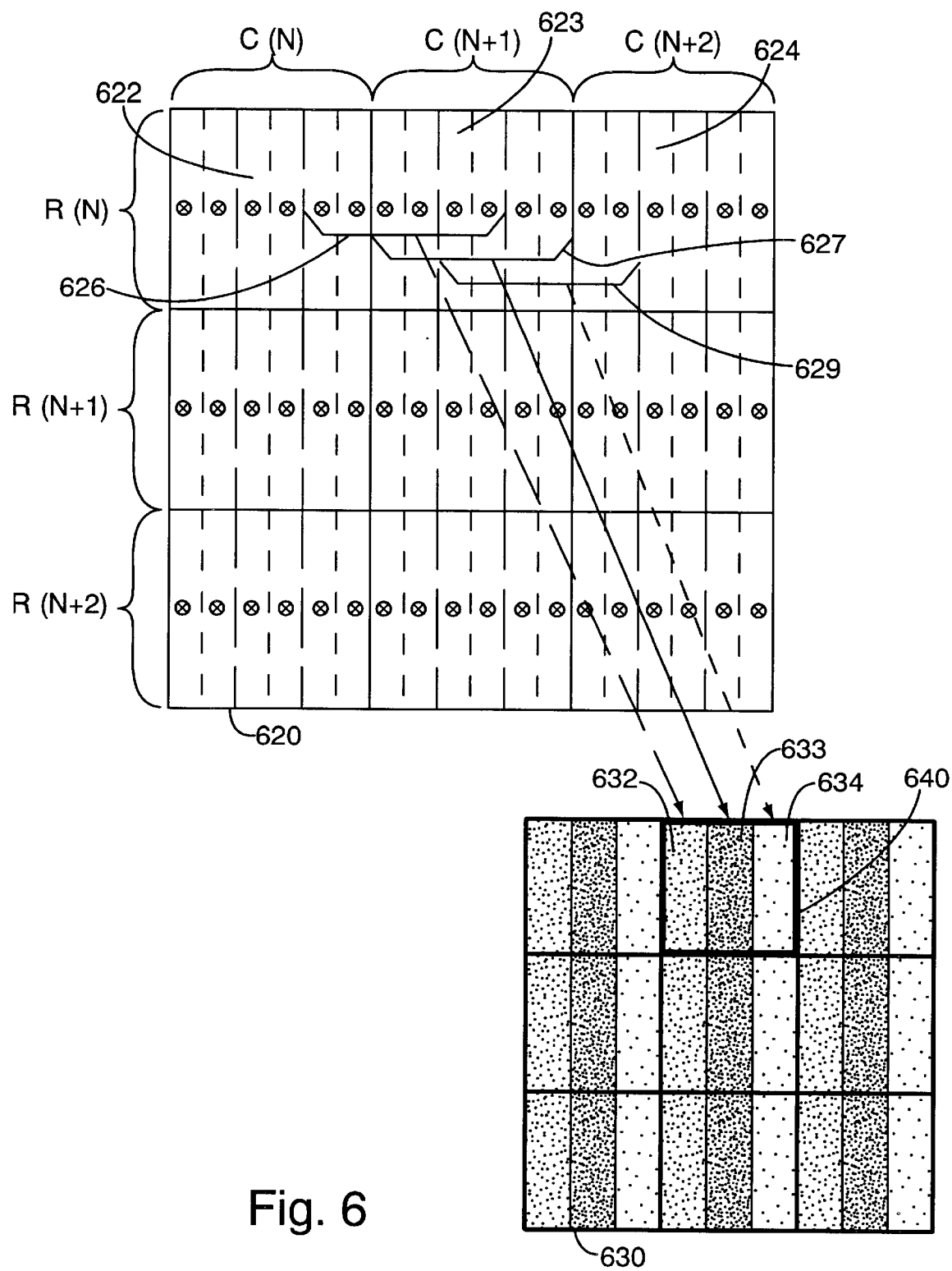
FIG. 6 illustrates a method of sampling and filtering images in accordance with an exemplary embodiment of the present invention.

FIG. 6 illustrates an exemplary image sampling and filtering method, used in accordance with one embodiment of the present invention. The sampling and filtering process illustrated in FIG. 6 is suitable for use with RGB striped displays, such as the vertically striped display represented by grid 630. In grid 630 dark solid lines are used to represent pixel boundaries while lighter solid lines are used to represent pixel sub-component boundaries. Red, green and blue pixel sub-components 632, 633, 636 of pixel 640 are illustrated in FIG. 6 using medium, dark and light speckling, respectively.

In FIG. 6, the grid 620 represents a source image, e.g., a scaled, hinted, foreground/background color representation of a text character. The source image 620 has been divided into 9 segments source image pixel segments corresponding to 3 rows R(N), R(N+1), R(N+2) and 3 columns C(N), C(N+1), C(N+2). The three segments in row (N) are identified by reference numerals 622, 623, 624. Each one of the 9 source image pixel segments is a source image portion which is proportional in size to one display pixel, e.g., pixel 640, of the display screen represented by grid 630. For purposes of illustration, each source image area is divided into three regions separated by long dashed lines used to represent the location of pixel sub-component boundaries in each source image pixel segment. Smaller dashed lines are used to divide each source image pixel sub-component segment into two sections for purposes of source image sampling.

In accordance with the present invention, each one of the source image segments 622, 623, 624 is over-sampled in the direction perpendicular to the RGB striping. In the FIG. 6 embodiment, the source image is over-sampled at a rate of 6× in the direction perpendicular to the striping, e.g., the horizontal direction, and at a rate of 1× in the direction parallel to the striping, e.g., the vertical direction. Thus, as illustrated in FIG. 6, 6 samples are generated per source image pixel area. Other sampling rates are also possible, e.g., sampling at 3n times in the horizontal direction and 1 times in the vertical direction could be used, where n is n is an integer, e.g., 2.

Figure 1:
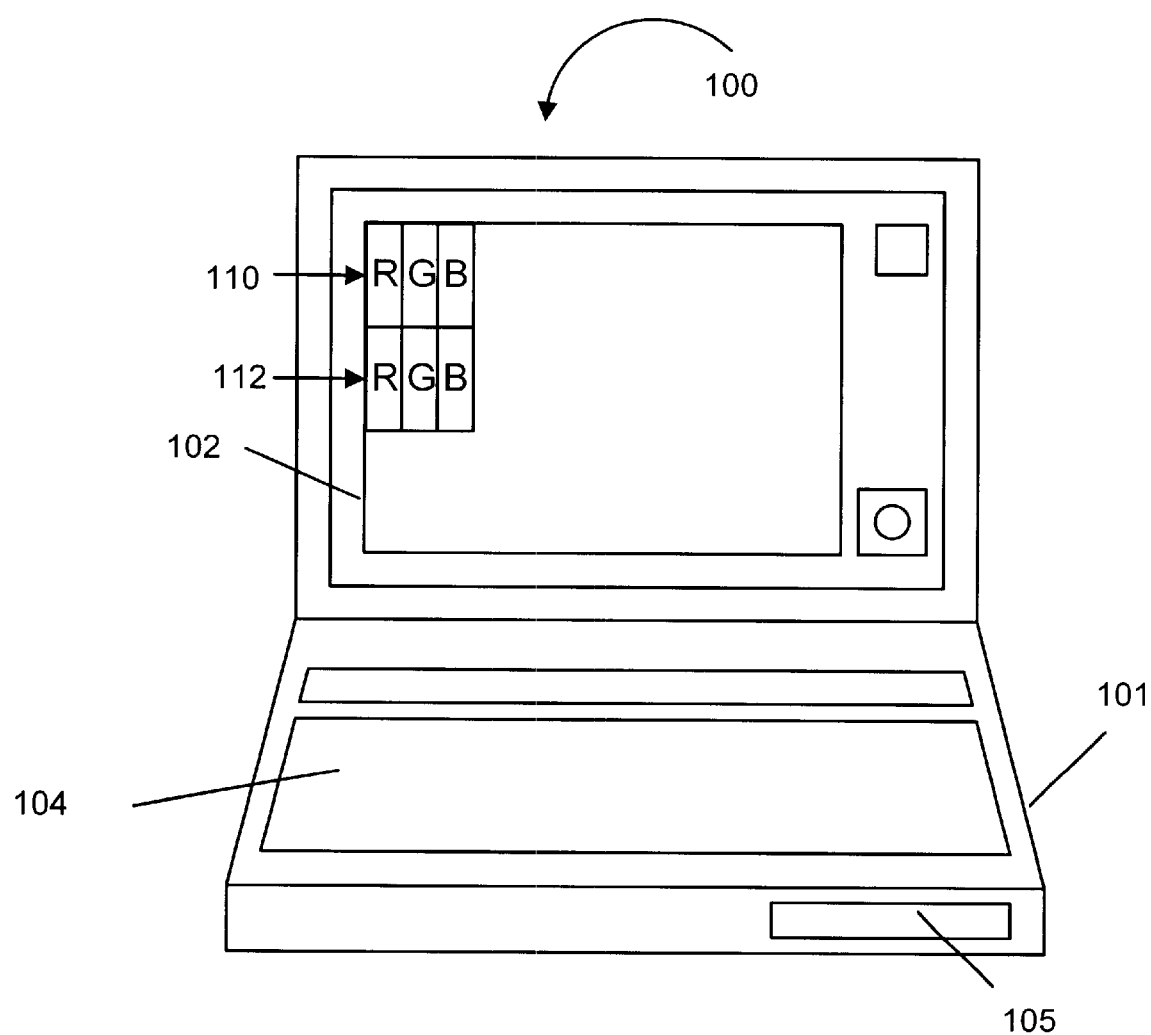
FIG. 1 illustrates a known portable computer including a striped LCD display.
Figure 2:
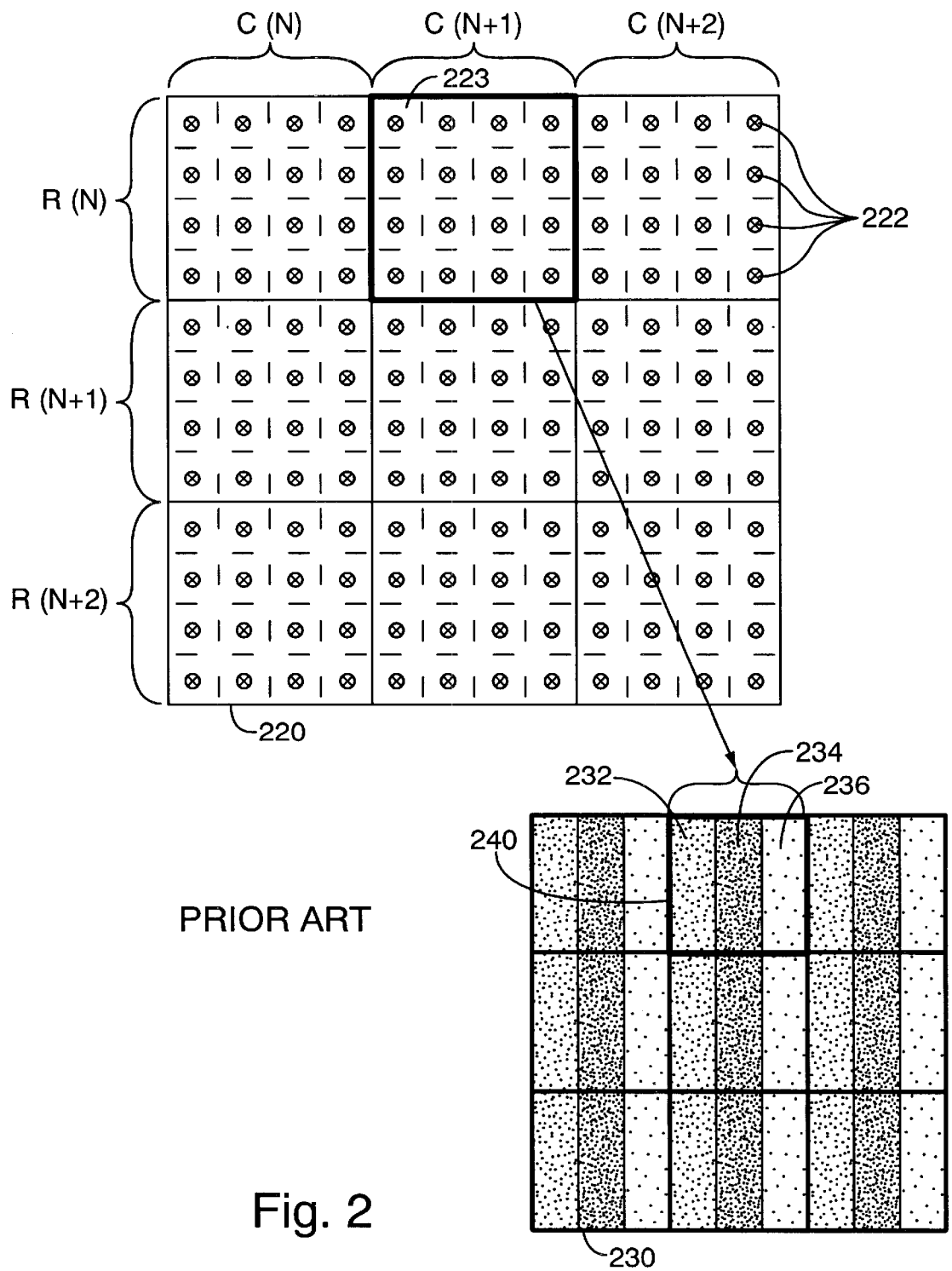
FIG. 2 illustrates a known image sampling method.
Figure 3:
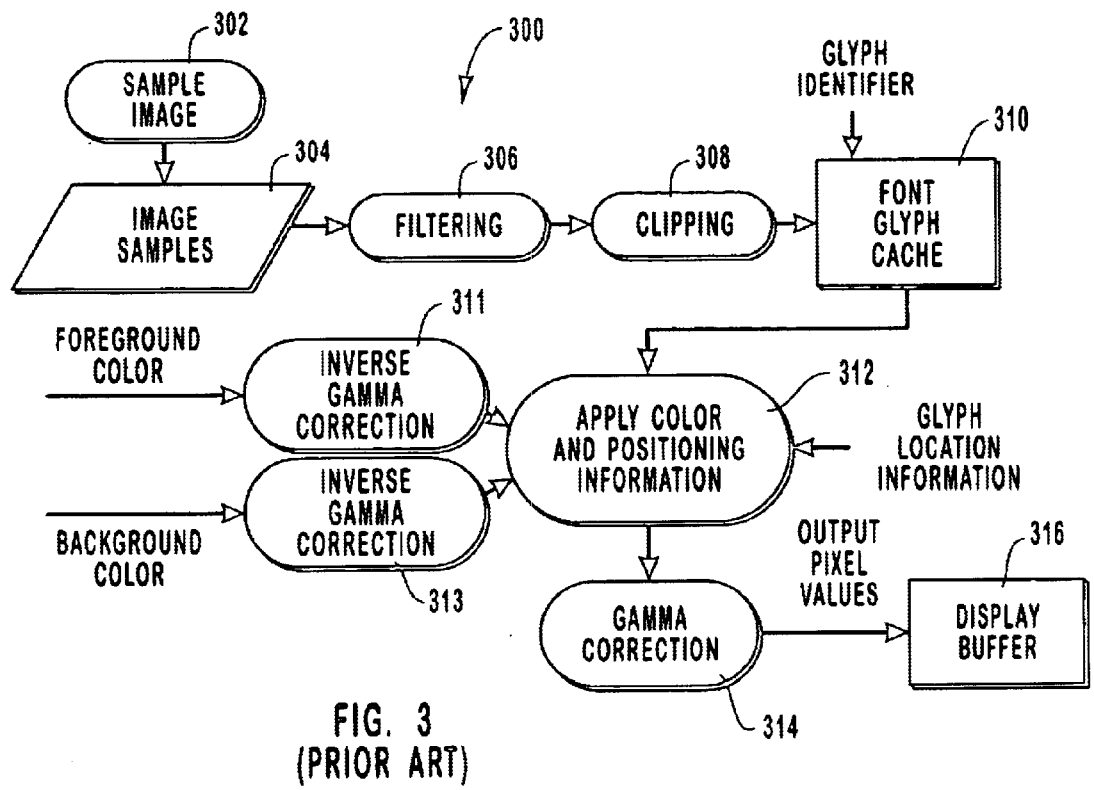
FIG. 3 illustrates a known process for rendering and displaying opaque glyphs.
Figure 4:
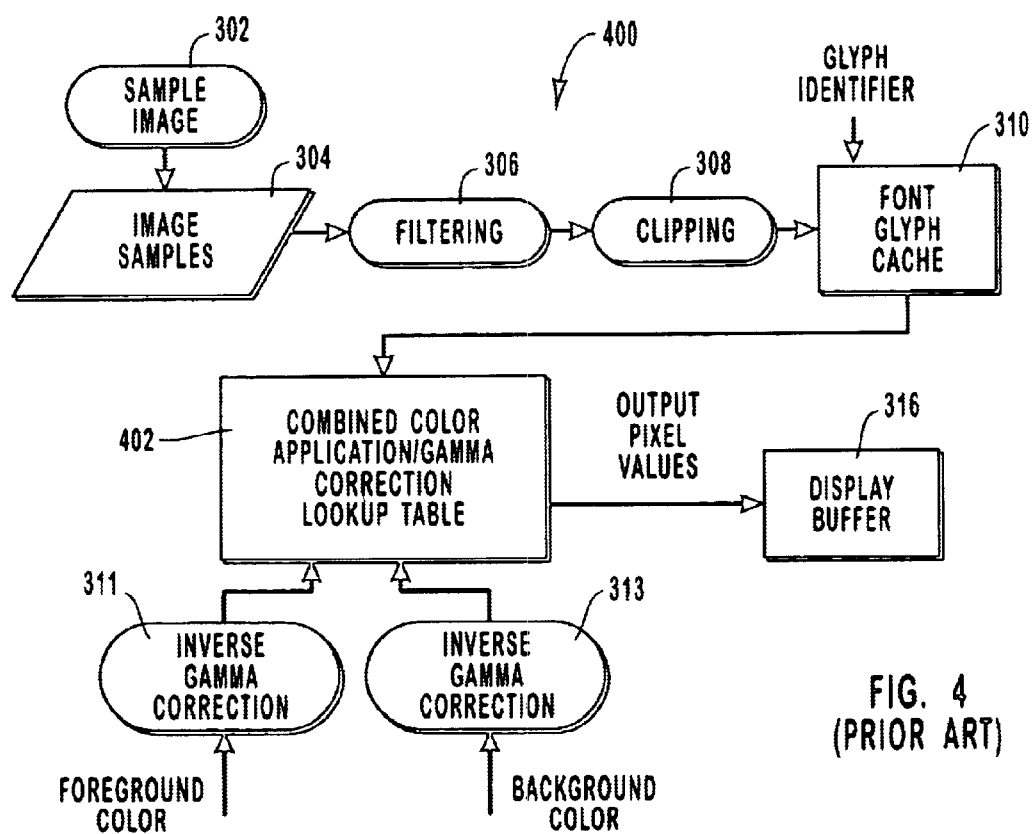
FIG. 4 illustrates a known process for rendering and displaying opaque glyphs which involves the use of a look-up table to perform both a color application and a gamma correction operation.
Figure 5:
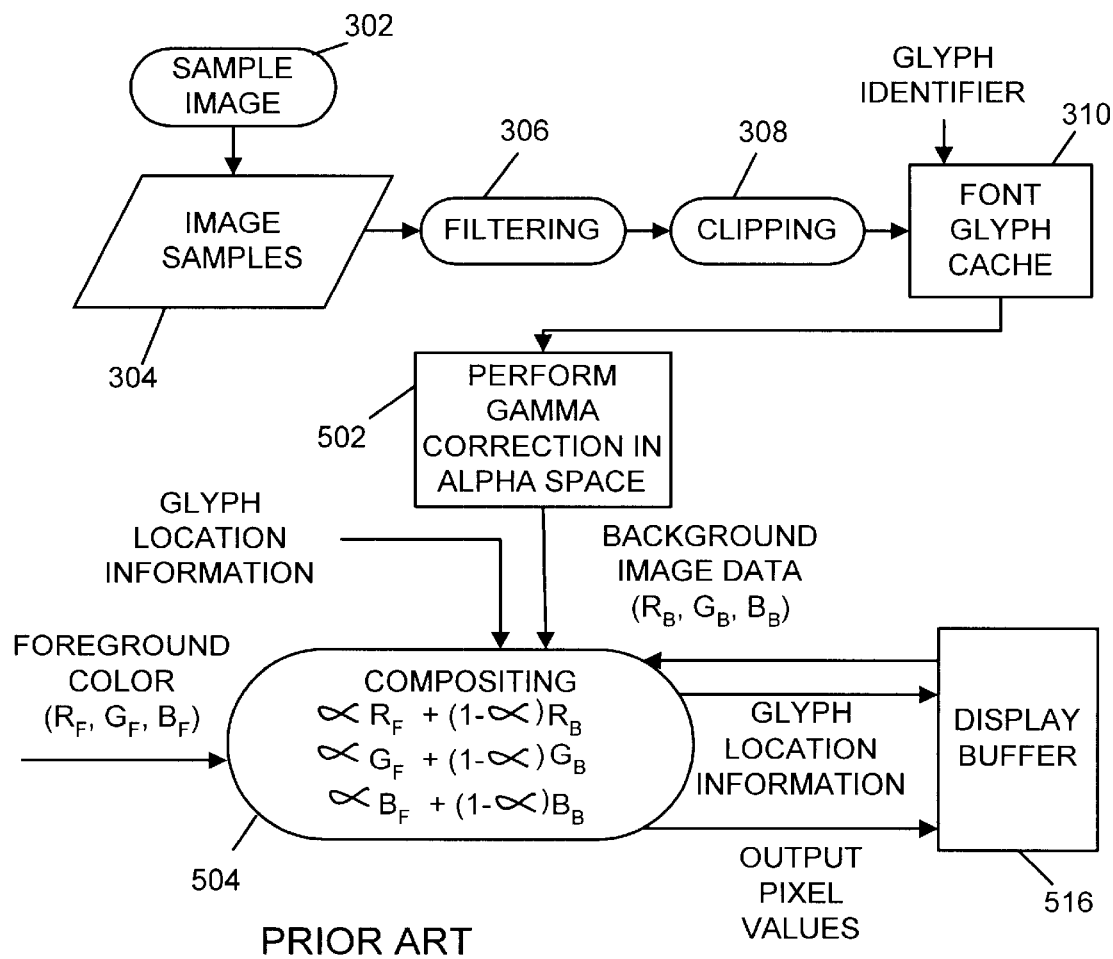
FIG. 5 illustrates a known process for rendering and displaying transparent glyphs.

Unlike the known image sampling and filtering process illustrated in FIG. 4, which uses the same set of samples to control each of the pixel sub-components of a pixel, the present invention uses different source image portions and thus sets of source image samples, to control each pixel sub-component of the display screen 630. For example, in the FIG. 6 embodiment, six samples centered horizontally about the location of each pixel sub-component to be controlled, are used to generate each pixel sub-component luminous intensity value. Since the centers of each of the red, green and blue pixel sub-components 632, 633, 634 are displaced from one another, the sets of samples used to control these pixel sub-components are also displaced from one another. Accordingly, the sampling and filtering techniques of the present invention used to generate pixel sub-component luminous intensity values may be described as displaced sampling with filtering.

In FIG. 6, the brackets 626, 627, 629 and arrows extending therefrom represent the filtering of image samples to produce a value used to control the pixel sub-component to which the arrow leads. For example, in the FIG. 6 illustration, bracket 626, and the arrow leading therefrom, is used to indicate the filtering of the 6 samples used to control the red pixel sub-component 632. Bracket 627 and the arrow leading therefrom is used to indicate the filtering of the 6 samples used to control the green pixel sub-component 632. In addition, bracket 629, and the arrow leading therefrom, is used to indicate the filtering of the 6 samples used to control the blue pixel sub-component 632. In accordance with the present invention, the filtering may be a simple box filtering operation implemented, e.g., by summing the value of the six samples being filtered.

Note that in the FIG. 6 embodiment, the filtering associated with the red and blue pixel sub-components 632, 634 depends on source image portions which neighbor source image pixel segment 623. Thus, unlike the known system illustrated in FIG. 4 where anti-aliasing filtering is limited to within a source image pixel segment, filtering implemented in accordance with the present invention extends across source image pixel segment boundaries. As will be discussed below, this can complicate the process of combining cached glyphs to form larger images, e.g., text strings, since filtering for red and blue pixel sub-components, in one *embodiment of the present invention, depends on the content of adjacent source image pixel areas.

Figure 7:
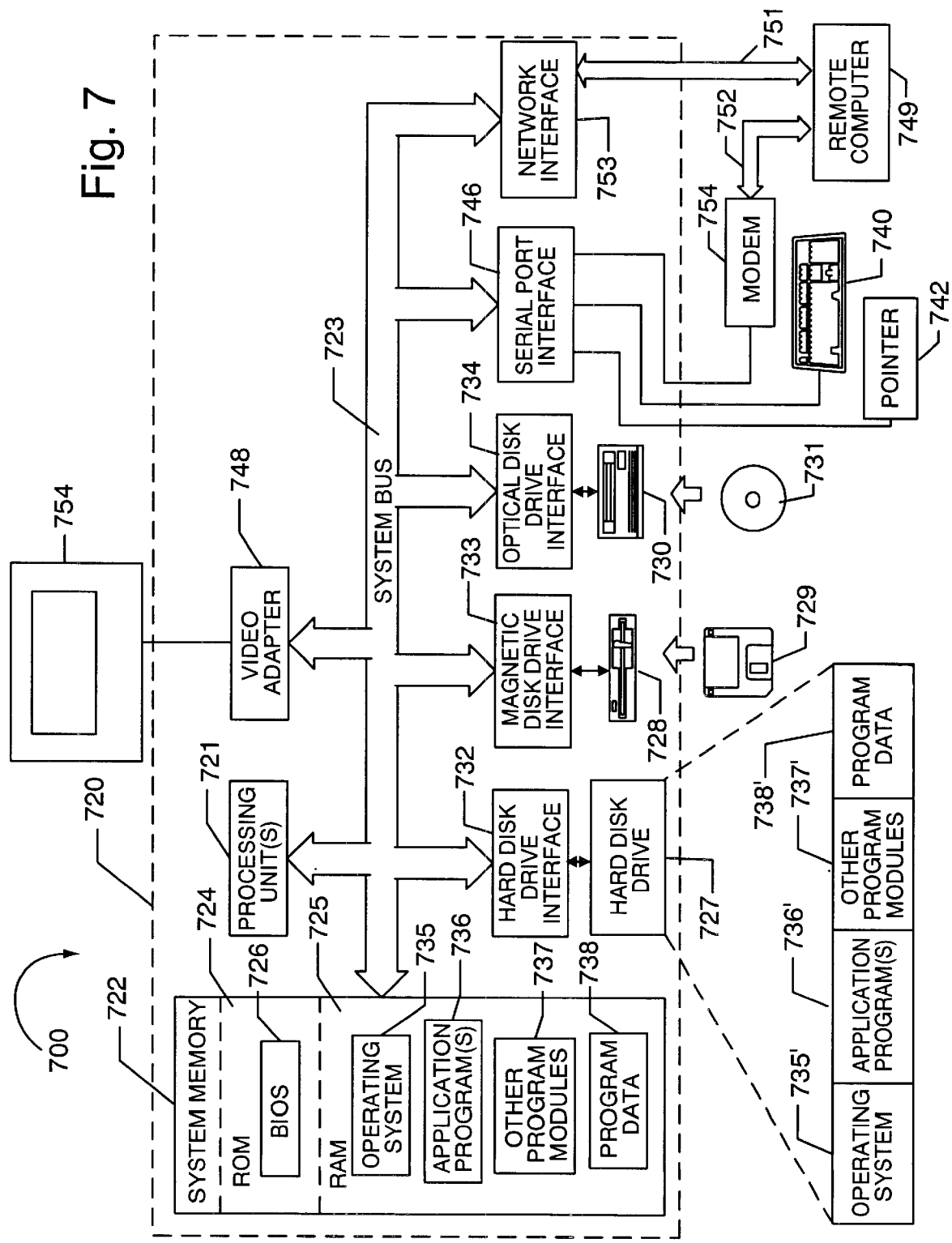
FIG. 7 illustrates a computer system of the present invention which implements the display methods and apparatus of the present invention.

FIG. 7 and the following discussion provide a brief, general description of an exemplary apparatus in which at least some aspects of the present invention, including the sampling and filtering illustrated in FIG. 6, may be implemented. Various methods of the present invention will be described in the general context of computer-executable instructions, e.g., program modules, being executed by a computer device such as a personal computer. Other aspects of the invention will be described in terms of physical hardware such as, e.g., display device components, image rendering hardware, and display screens.

The methods of the present invention may be affected by other apparatus than the specific described computer devices. Program modules may include routines, programs, objects, components, data structures, etc. that perform task (s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, displays used in, e.g., automotive, aeronautical, industrial applications, and the like. At least some aspects of the present invention may also be practiced in distributed computing environments where tasks are performed by remote processing devices linked through a communications network. In a distributed computing environment, program modules, routines and data, e.g., character font file, may be located in local and/or remote memory storage devices.

FIG. 7 illustrates an exemplary apparatus 700 for implementing at least some aspects of the present invention. The apparatus 700 includes a general purpose computing device, e.g., a portable personal computer 720. The personal computer 720 may include a processing unit 721, a system memory 722, and a system bus 723 that couples various system components including the system memory to the processing unit 721. The system bus 723 may be any of several types of bus structures including a memory bus or memory controller, a peripheral bus, and a local bus using any of a variety of bus architectures. The system memory 722 may include read only memory (ROM) 724 and/or random access memory (RAM) 725. A basic input/output system 726 (BIOS), including basic routines that help to transfer information between elements within the personal computer 720, such as during start-up, may be stored in ROM 724. The personal computer 700 may also include a hard disk drive 727 for reading from and writing to a hard disk, (not shown), a magnetic disk drive 728 for reading from or writing to a (e.g., removable) magnetic disk 729, and an optical disk drive 730 for reading from or writing to a removable (magneto) optical disk 731 such as a compact disk or other (magneto) optical media. The hard disk drive 727, magnetic disk drive 728, and (magneto) optical disk drive 730 may be coupled with the system bus 723 by a hard disk drive interface 732, a magnetic disk drive interface 733, and a (magneto) optical drive interface 734, respectively. The drives and their associated storage media provide nonvolatile storage of machine readable instructions, data structures, program modules and other data for the personal computer 720. Although the exemplary environment described herein employs a hard disk, a removable magnetic disk 729 and a removable optical disk 731, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 727, magnetic disk 728, (magneto) optical disk 731, ROM 724 or RAM 725, such as an operating system 735, one or more application programs 736, other program modules 737, and/or program data 738 for example. As will be discussed below, the operating system 735 may include character font files which include high resolution representations of characters and one or more gnat tables which include character stem width control information. A user may enter commands and information into the personal computer 720 through input devices, such as a keyboard 740 and pointing device 742 for example.

Additional input devices (not shown) such as a microphone, joystick, game pad, satellite dish, scanner, or the like may also be included. These and other input devices are often connected to the processing unit 721 through a serial port interface 746 coupled to the system bus. However, input devices may be connected by other interfaces, such as a parallel port, a game port or a universal serial bus (USB). Liquid crystal display device 754 or another type of display device, e.g., a CRT display, may also be connected to the system bus 723 via an interface, such as a video adapter 748 for example.

In addition to the display 754, the personal computer 720 may include other peripheral output devices (not shown), such as speakers and printers for example.

The personal computer 720 may operate in a networked environment which defines logical connections to one or more remote computers, such as a remote computer 749. The remote computer 749 may be another personal computer, a server, a router, a network PC, a peer device or other common network node, and may include many or all of the elements described above relative to the personal computer 720, although only a memory storage device 750 has been illustrated in FIG. 7. The logical connections depicted in FIG. 7 include a local area network (LAN) 751 and a wide area network (WAN) 752, an intranet and the Internet.

When used in a LAN, the personal computer 720 may be connected to the LAN 751 through a network interface adapter (or "NIC") 753. When used in a WAN, such as the Internet, the personal computer 720 may include a modem 754 or other means for establishing communications over the wide area network 752. The modem 754, which may be internal or external, may be connected to the system bus 723 via the serial port interface 746. In a networked environment, at least some of the program modules depicted relative to the personal computer 720 may be stored in a remote memory storage device. The network connections shown are exemplary and other means of establishing a communications link between the computers may be used.

Figure 8:
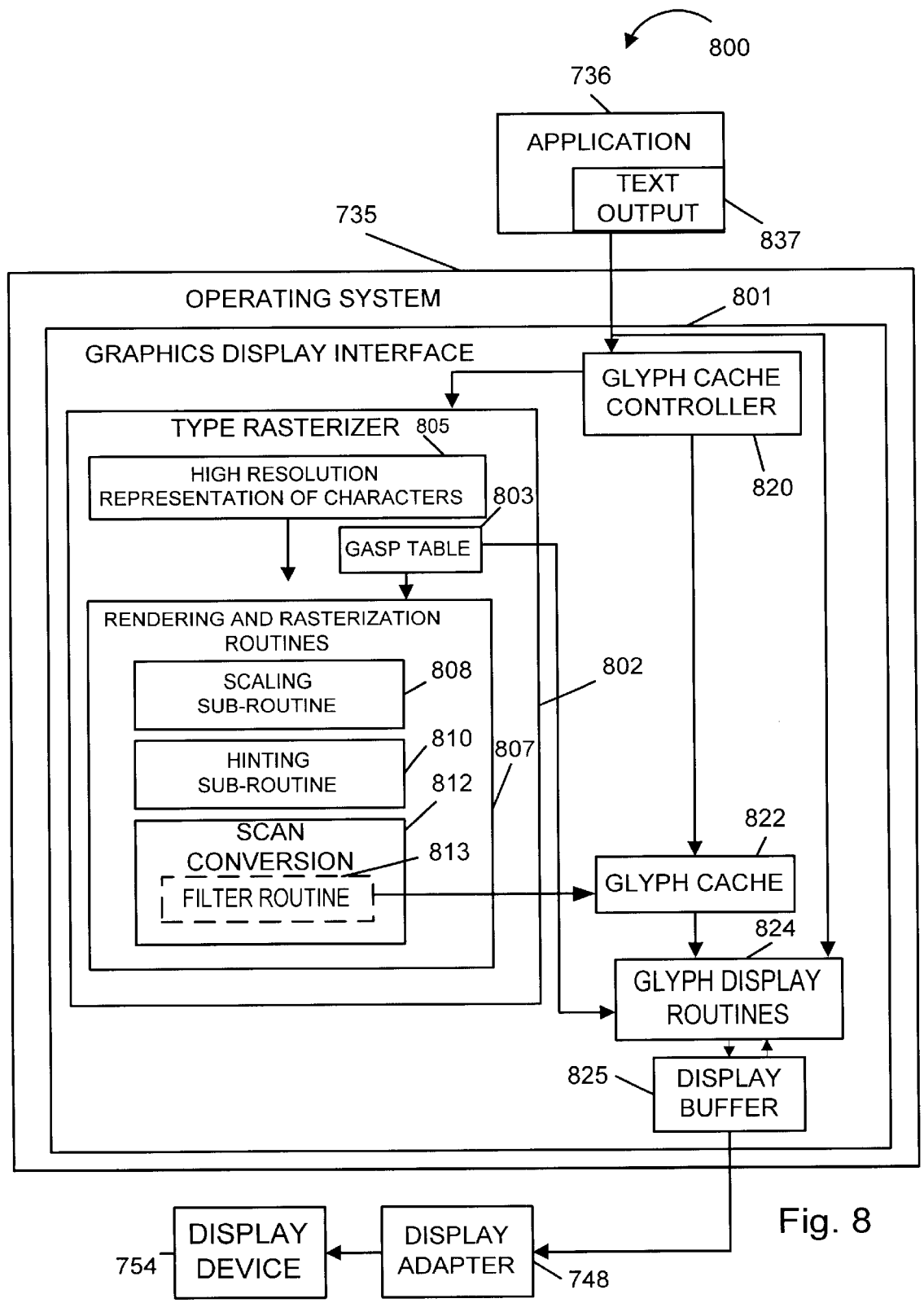
FIG. 8 illustrates various components of the computer system of FIG. 7 in greater detail.

FIG. 8 illustrates the relationship between various hardware and software components 800 including application program 736, operating system 735, video adapter 748 and display device 754, of the system 700.

In the illustrated embodiment, operating system 735 includes a graphics display interface (GDI) 801. The GDI 801 includes a glyph cache controller 820, type rasterizer 802, glyph cache 822, glyph display routines 824, and display buffer 825. The arrows leading to and from the display buffer 825 and glyph display routines 824 indicate that data can be written to and read from the display buffer 825.

The text output of application 837 includes information identifying the content of a text string, e.g., the sequence of characters included therein, in addition to character font and point size information. The text output information 837, generated by application 736, may also include character positioning information, e.g., angling or spacing information, and/or foreground/background color information. The character positioning information and/or foreground/background color information is supplied to the glyph display routines 824.

The glyph cache controller 820 is responsible for managing the content and output of the glyph cache 822. The glyph cache controller 820 receives the text output information 837 including the character, font and point size information. The controller 820 determines if a character to be displayed is already stored in the glyph cache 822.

If a character glyph corresponding to a character to displayed at a specified point size is already stored in the glyph cache 822, the glyph cache controller 820 controls the glyph cache 822 to output the corresponding character glyph. The character glyph is supplied to the glyph display routines 824, which are responsible for combining individual glyphs into a larger image for display purposes and applying foreground/background color selections.

However, if a character glyph corresponding to a character to be displayed at a specified point size is not already stored in the glyph cache 822, the glyph cache controller 820 provides the character, font and point size information to the type rasterizer 802.

The type rasterizer 802 is responsible for generating a character glyph from the received information.

The type rasterizer 802 includes a set of high resolution digital representations of characters 805; a GASP table 803, including character stem width control information; and a set of rendering and rasterization routines 807. The digital representation of characters 805 may include font files which include scalable outline representations of characters and character spacing information. The character outlines may be expressed in the form of lines, points, curves and/or arcs. Portions of a character within a character outline represent foreground image areas while portions outside the character outlines, e.g., the area between characters, represent background image areas.

The GASP table 803 includes information which indicates the display point size at which stem weights for a stored font should transition from one to two pixels in width. As will be discussed below, this table, in some embodiments, is used to determine which characters should have their stem widths increased, e.g., bloated, under certain conditions discussed below.

The set of rendering and rasterization routines 807 includes scaling, hinting and scan conversion subroutines 808, 810, 812 as well as a color compensation sub-routine 870.

Scaling sub-routine 808 is responsible for scaling the outline representations of the characters to be rendered. This is done, in accordance with the present invention, as a function of pixel pattern and/or direction of display striping. For example, in the exemplary embodiment, the outline representations of the characters to be rendered are scaled at a rate perpendicular to the direction of striping at a rate which is an integer multiple of the rate of scaling in the direction of striping.

Hinting sub-routine 810 is responsible for adjusting the shape and/or position of character outlines. Hinting is performed as a function of display device characteristics and takes into consideration the position, shape, type and/or arrangement of pixel sub-components which comprise the display 754.

Scan conversion sub-routine 812 is responsible for generating a bitmap representation, e.g., a character glyph, from the hinted outline representation produced by the hinting sub-routine 312. The scan conversion operation involves sampling the hinted outline image representation and then, optionally, filtering the sampled image values prior to storage in the glyph cache. An optional filter routine 813 is illustrated using dashed lines as part of the scaling routine 812. As will be discussed below, filtering 813 may be performed as part of the glyph display routines 824 when it is not performed prior to generated glyphs being placed in the glyph cache 822. In accordance with the present invention, character glyphs may be represented as sets of sampled alpha values or, alternatively, filtered alpha values corresponding to red, green and blue pixel sub-components of individual pixels. In addition to the alpha value information generated character glyphs may include character spacing information such as one or more side bearing points. In cases where filtering is applied prior to glyph caching, the three filtered alpha values per pixel may be stored in a compressed format.

The character glyphs generated by the type rasterizer 805 are stored in the glyph cache 822 prior to being output under the direction of the glyph cache controller 820. In this manner, the glyph cache serves as a repository for character glyphs.

The glyph display routines 824 are responsible for processing character glyphs output by the glyph cache 822. The routines 824 combine the received glyphs into larger images, e.g., images of text strings, and apply foreground/background color selections. The glyph display routines 824 may also filter all or parts of the larger image generated from the character glyphs, e.g., prior to the application of foreground/background color selections.

The glyph display routines 824 include different routines for processing opaque and transparent glyphs. In the case of opaque glyphs, foreground and background color selections are applied uniformly to the entire image being generated, i.e., set foreground and background colors are applied. In the case of transparent glyphs, a uniform foreground color is applied and a background image, e.g., a previously displayed image, is used to provide the background color.

In the case of transparent glyphs, background color information is normally obtained from the display buffer 825.

Through the application of foreground/background color selections, gamma correction processes and various filtering operations, the glyph display routines 824 generate R, G, B pixel sub-component luminous intensity values which represent the characters to be displayed. The generated R, G, B luminous intensity values are stored in the display buffer 825, in memory locations corresponding to the pixel sub-components of the display device 754, which are to be controlled by the stored values.

Periodically, the values stored in the display buffer 825 are supplied to the display adapter 748. The display adapter 748 processes the received luminous intensity values and converts them into a signal format which is supported by the display device 754. In response to receiving signals from the display adapter 748, the display device 754 displays the text characters corresponding to text output 837.

The generation of text strings from cached character glyphs represented using alpha values, is complicated by the applied filtering of the present invention which is allowed to span across pixel, and thus character glyph, boundaries. As a result of the applied filtering, luminous intensity values of pixels located along glyph boundaries depend on the content of the neighboring character glyph.

Figure 9:
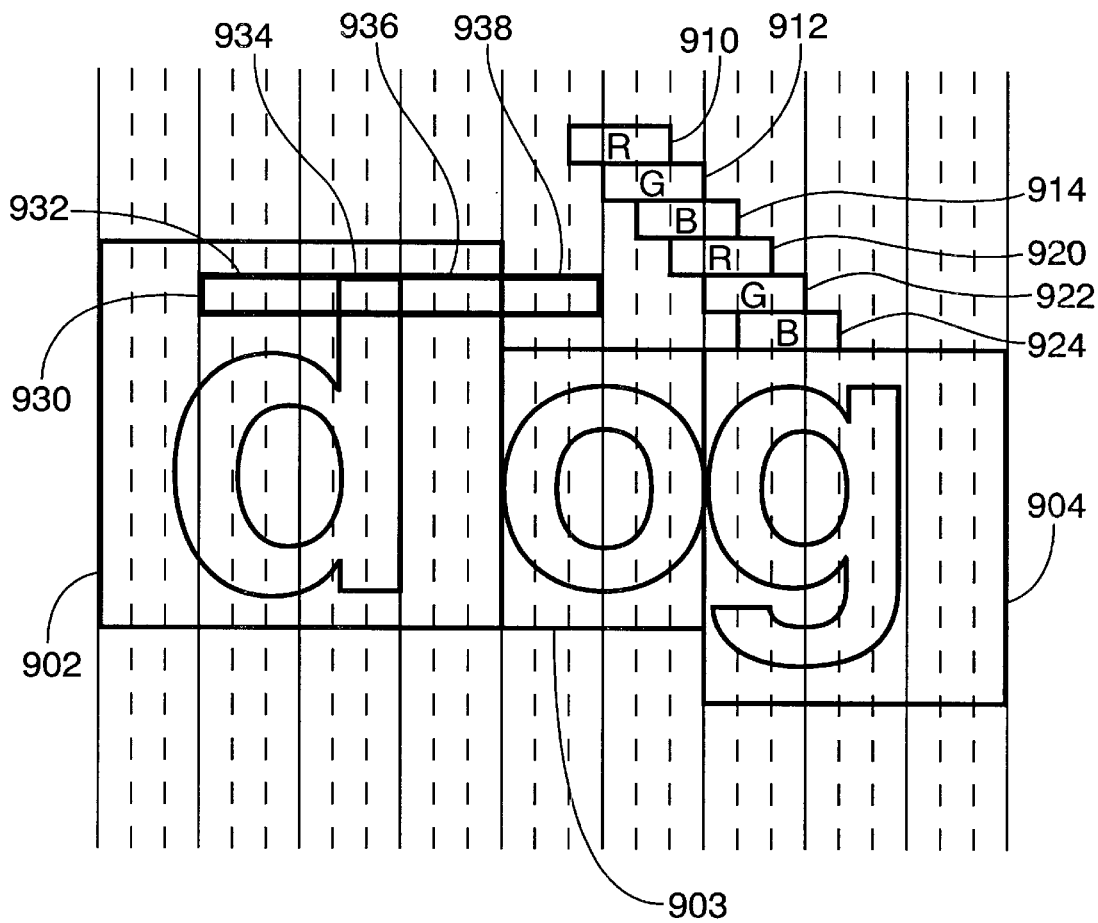
FIG. 9 illustrates sampling and filtering features of the present invention as applied to a text character string comprising three character images.

Consider for example the case of combining character glyphs corresponding to the letters d, o, g to form the word "dog" as illustrated in FIG. 9. In FIG. 9, box 902, represents the character glyph for the letter "d", box 903 represents the character glyph for the letter "o" and box 904 represents the character glyph for the letter "g". While the characters are shown in FIG. 9, each character glyph would, in actuality, be represented by a set of alpha values. Solid lines indicate pixel boundaries while dashed lines are used in FIG. 9 to indicate sub-pixel boundaries. Boxes 910, 912, 914 illustrate the horizontal location of the box filters used in accordance with the present invention to filter the alpha values used to generate the R, G, and B pixel sub-component luminous intensity values of a first pixel located along the left side of the vertical o-g glyph boundary. Box filters 910, 912, 914 are illustrated as being vertically displaced for purposes of illustration. In the exemplary embodiment, displacement of the box filters 910, which are used for horizontally adjacent image areas, occurs in the horizontal but not the vertical image direction. Box filters 920, 922, 924 are used for filtering a pixel located on the right side of a vertical o-g glyph boundary plane.

Note how the output of the red box filter 910 depends on the alpha values from the source image segment adjacent, and to the left of, the pixel image segment to which the red pixel sub-component corresponds. Also note how the output of the blue box filter 914 depends on the alpha values from the source image pixel segment to the right of the pixel image segment to which the blue pixel sub-component corresponds. In the case where character images are not separated horizontally by at least one pixel sub-component of background color space (equivalent to 2 samples in the case of over-sampling by 6), bleeding of the color from the neighboring character glyph into the adjacent character glyph will occur for pixels along the glyph boundary where the character images touch.

Figure 10:
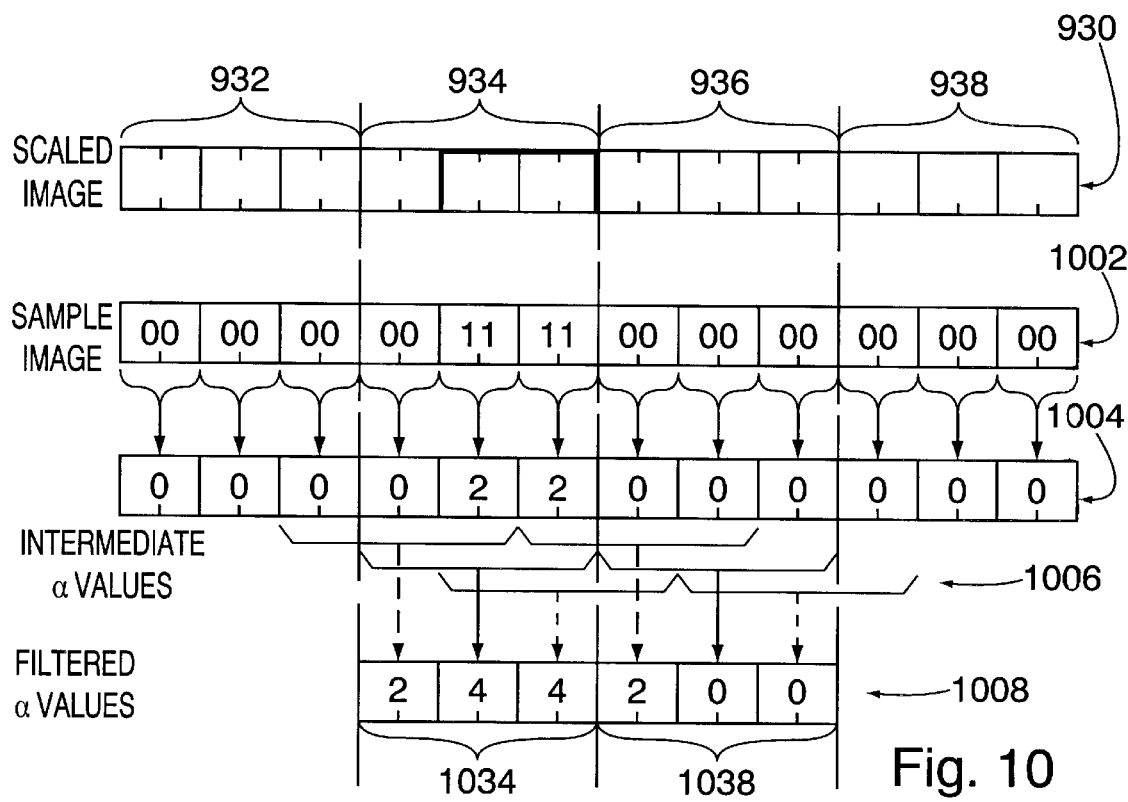
FIG. 10 illustrates the sampling and filtering of a portion of a text character illustrated in FIG. 9, in accordance with an exemplary embodiment of the present invention.

The effect of adjacent source image portions located across pixel boundaries, in the case of over-sampling by 6 and the use of box filters 6 samples wide, is apparent in the example shown in FIG. 10. FIG. 10 illustrates the application of sampling and filtering in accordance with the present invention, as applied to image segment 930 which includes four adjacent source image pixel segments 932, 934, 936, 938.

In accordance with the present invention, source image segments 932, 934, 936, 938 are each over-sampled by a factor of 6 to produce a set of 6 samples per source image pixel segment. Row 1002 of FIG. 10, illustrates, directly below each source image segment, the values of the samples obtained from the corresponding source image segments. For example, sample values (0,0,0,0,0,0) are obtained by sampling source image segments 932, 936 and 938 while sample values (0,0,1,1,1,1) are obtained by sampling source image segment 934.

In many embodiments, pairs of individual samples are summed to form a set of intermediate alpha values, 3 per source image pixel segment area. The summing of pairs of alpha values is done for purposes of computational and storage efficiency. It also permits the intermediate alpha values to be generated in a font driver while filtered alpha values are generated by the graphics display interface 801. The separation of the generation of the intermediate alpha values and filtered alpha values allows a font driver to be generated without concern or knowledge of how the GDI 801 generates filtered alpha values.

The intermediate alpha values corresponding to each source image pixel segment is shown in FIG. 10 in row 1004 directly below the corresponding source image to pixel segment area. As illustrated intermediate alpha values (0,0,0) are generated from source image pixel segment areas 932, 936 and 938 while intermediate alpha values (0, 2, 2) are generated from source image pixel segment 934.

In accordance with the present invention, box filtering is applied to the intermediate alpha values as represented by the brackets generally indicated by reference numeral 1006. The box filtering produces filtered alpha values at a rate of one filtered alpha value per pixel sub-component which, in the exemplary embodiment, is three alpha values per pixel, i.e., one for each of the R, G, and B pixel sub-components of a pixel.

The alpha values for the R, G and B pixel sub-components of two adjacent pixels 1034, 1036 are shown in row 1008. In row 1008, it can be seen that the R, G, B (filtered) alpha values for pixel 1034 are 2, 4, 4, respectively. In addition, it can be seen that the R, G, B alpha values for pixel 1038 are 2, 0, 0, respectively.

The effect of neighboring source image pixel segments on the alpha values generated for pixel 1038 are apparent from a review of the R alpha value which is 2. This value is the result of using the right most intermediate alpha value corresponding to neighboring source image pixel segment 934 when calculating the R alpha value for pixel 1038. The effect of neighboring foreground colored image segments on the generated R and B alpha values can be described as color leakage or color bleeding.

As discussed above, color leakage complicates the filtering process since the filtering process is dependent on neighboring source image pixel segments which may belong to a different character glyph. Color leakage does not occur when the portion of the neighboring source image pixel segment, which is used during filtering, corresponds to the background color, i.e., has sample values of 0. This can be seen by examining the R, G, B alpha values of pixel 1034, which are unaffected by the background colored neighboring source image pixel segments 932, 936.

From the above discussion it becomes apparent that pixels located adjacent character glyph boundaries may be subject to color leakage to the extent that the filters used extend beyond character glyph boundaries. Given the filtering used in the exemplary embodiment, which extends one pixel sub-component over character glyph boundaries, assuming non-overlapping character glyphs, it is pixels located immediately adjacent a character glyph boundary which may be subject to the effect of color leakage across the character glyph boundary. Thus, only the two stripes, e.g., the first and last vertical pixel stripe, of adjoining character glyph may be subject to the effect of color leakage across pixel boundaries.

In the FIG. 9 illustration, color leakage will occur at the vertical intersection of the o and g character glyphs 903, 904 at the point where the o and g character outlines abut the glyph boundary. However, at portions of the vertical intersection of the o and g charter glyphs 903, 904, where there is at least a pixel sub-component sized portion of background color on each size of the glyph boundary, no color leakage will occur.

The filtering technique of the present invention and the potential for color leakage will now be discussed with reference to FIG. 11.

Figure 11:
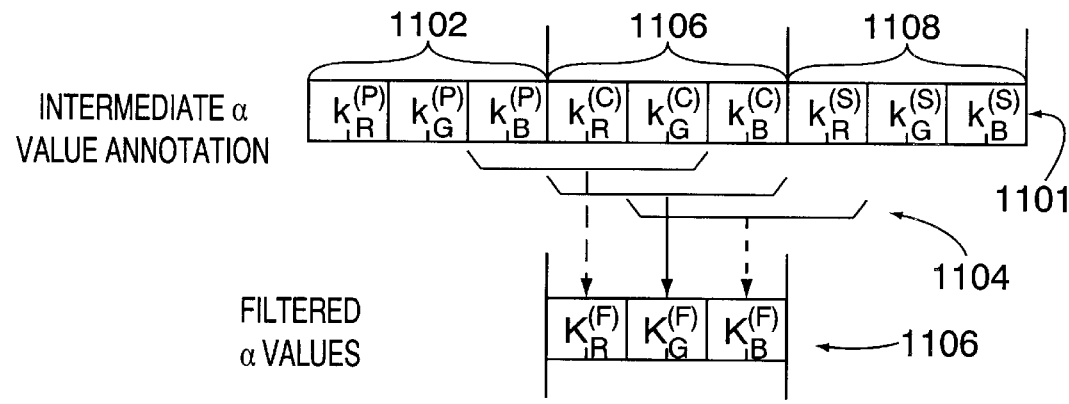
FIG. 11 illustrates utilized intermediate alpha value annotation and how intermediate alpha values relate to the filter output values produced from intermediate alpha values.

FIG. 11 illustrates in row 1101, intermediate alpha values corresponding to three source image pixel segments 1102, 1106, 1108. As discussed above, the three intermediate alpha values include a R, a G, and a B pixel sub-component intermediate alpha value, for each source image pixel segment.

FIG. 11 also illustrates, through the use of brackets generally indicated by the reference numeral 1104, block filtering performed to generate each of three filtered alpha values illustrated in row 1106. The three filtered alpha values include a R, a G and a B filtered alpha value corresponding to the red, green and blue pixel sub-components, respectively, of a current pixel.

Because of the implemented filtering, the filtered alpha values generated for each pixel depend on the intermediate alpha values corresponding to a current source image pixel segment, one intermediate alpha value from a preceding source image pixel segment and one intermediate alpha value from a subsequent source image pixel segment.

In FIG. 11, the small letter k is used to represent intermediate alpha values, while the large letter K is used to represent a filtered unnormalized alpha value. Subscripts R, G, and B are used to indicate the pixel sub-component to which the illustrated intermediate or filtered alpha value corresponds. The superscript (P) is used to indicate a value corresponding to a preceding source image pixel segment, the superscript (C) is used to indicate a value corresponding to a current source image pixel segment and the superscript (S) is used to indicate a value corresponding to a subsequent source image pixel segment. In addition, the superscript (F) is used to further indicate a filtered alpha value produced by the filtering operation of the present invention.

The filtering performed in accordance with the present invention may be expressed as follows:

$$K_R^{(F)} = k_B^{(P)} + k_R^{(C)} + k_G^{(C)}$$

$$K_G^{(F)} = k_R^{(C)} + k_G^{(C)} + k_B^{(C)}$$

$$K_B^{(F)} = k_G^{(C)} + k_B^{(C)} + k_R^{(S)}$$

Thus, in accordance with the present invention, the set of three filtered alpha values per pixel is generated from a set of 5 intermediate alpha values.

Given that there are a limited number ($3^5$) of possible input alpha value combinations, it is possible to pre-compute the set of filtered output values that will result from each set of possible intermediate alpha value coefficients. In one embodiment, the computations are made and the resulting filtered output values are stored in a look-up table which is used to implement the filtering operation of the present invention. Thus, the filtering computations need not be performed repeatedly in real time for each image being displayed.

Figure 12:
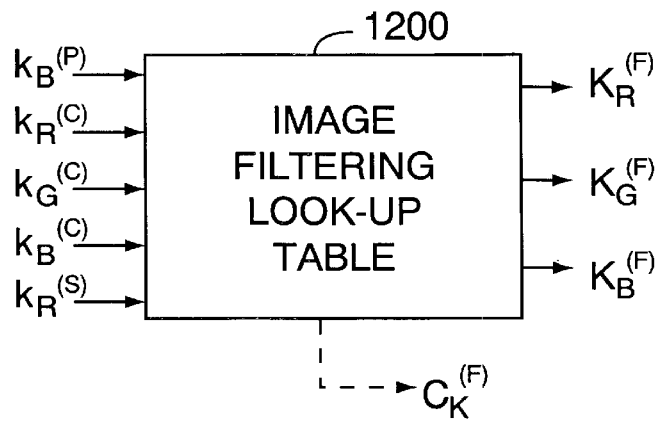
FIG. 12 illustrates an image filtering look-up table which can be used to perform a filtering operation in accordance with the present invention.

An image filtering look-up table 1200, implemented in accordance with the present invention, is illustrated in FIG. 12. The look-up table 1200 receives as its input the five intermediate alpha values ($k_B^{(F)}$, $k_R^{(C)}$, $k_G^{(C)}$, $k_B^{(C)}$, $K_R^{(S)}$) required to generate a set of R, G, and B filtered alpha values. The five input values are used as an index into the look-up table 1200 to locate a corresponding set of filtered alpha values ($K_R^{(F)}$, $K_G^{(F)}$, $K_B^{(F)}$) which are then output by the look-up table 1200.

Because the filtering operations used to generate the R, G and B filtered alpha values are not completely independent, only 115 different output combinations of filtered alpha values may occur. Accordingly, it is possible to represent a set of three filtered alpha values associated with a pixel as a single is value in the range of 0–114. By using a value in the range of 0–114 to represent 3 filtered alpha values lossless data compression is achieved. Significantly, the values 0–114 can be represented using only 8 bits as opposed to 9 bits that would be needed to individually represent three district filtered alpha values each capable of assuming a value in the range 0–6. In embodiments which cache filtered alpha values, as will be discussed below, the 3 filtered alpha values for each pixel are represented in a compressed format as a number in the range of 0–114. Filtered alpha value compression and decompression can be implemented through the use of a look-up table. In fact, in embodiments where data compression is used, the image filtering look-up table may output a single value $CK^{(F)}$ representing, in compressed form, the 3 filtered alpha values $K_R^{(F)}$, $K_{G(F)}$, $K_B^{(F)}$. The line exiting look-up table 1200 and terminating in the symbol $CK^{(F)}$ is shown using a dotted line to indicate that it is an alternative to the look-up table 1200 separately outputting 3 filtered alpha values.

The present invention supports two general filtering embodiments, a first filtering embodiment which involves the application of the above described filtering subsequent to the caching of character glyphs and the second filtering embodiment supporting filtering of glyphs prior to the caching of character glyphs.

The first filtering embodiment involves performing the intermediate alpha value filtering discussed above, subsequent to the output of glyphs from a glyph cache and the combining, e.g., concatenation, of glyphs to form larger images, e.g., text strings. In such post cache filtering embodiments, glyphs are represented in the glyph cache as intermediate alpha value information. In the post cache filtering embodiment color leakage across glyph boundaries does not present a problem at filtering time. This is because, in such embodiments, glyphs are represented using intermediate alpha value information and are concatenated prior to filtering. Thus, by the time filtering is performed, the intermediate alpha values located adjacent glyph boundaries are defined and available for use during the filtering process.

Figure 13:
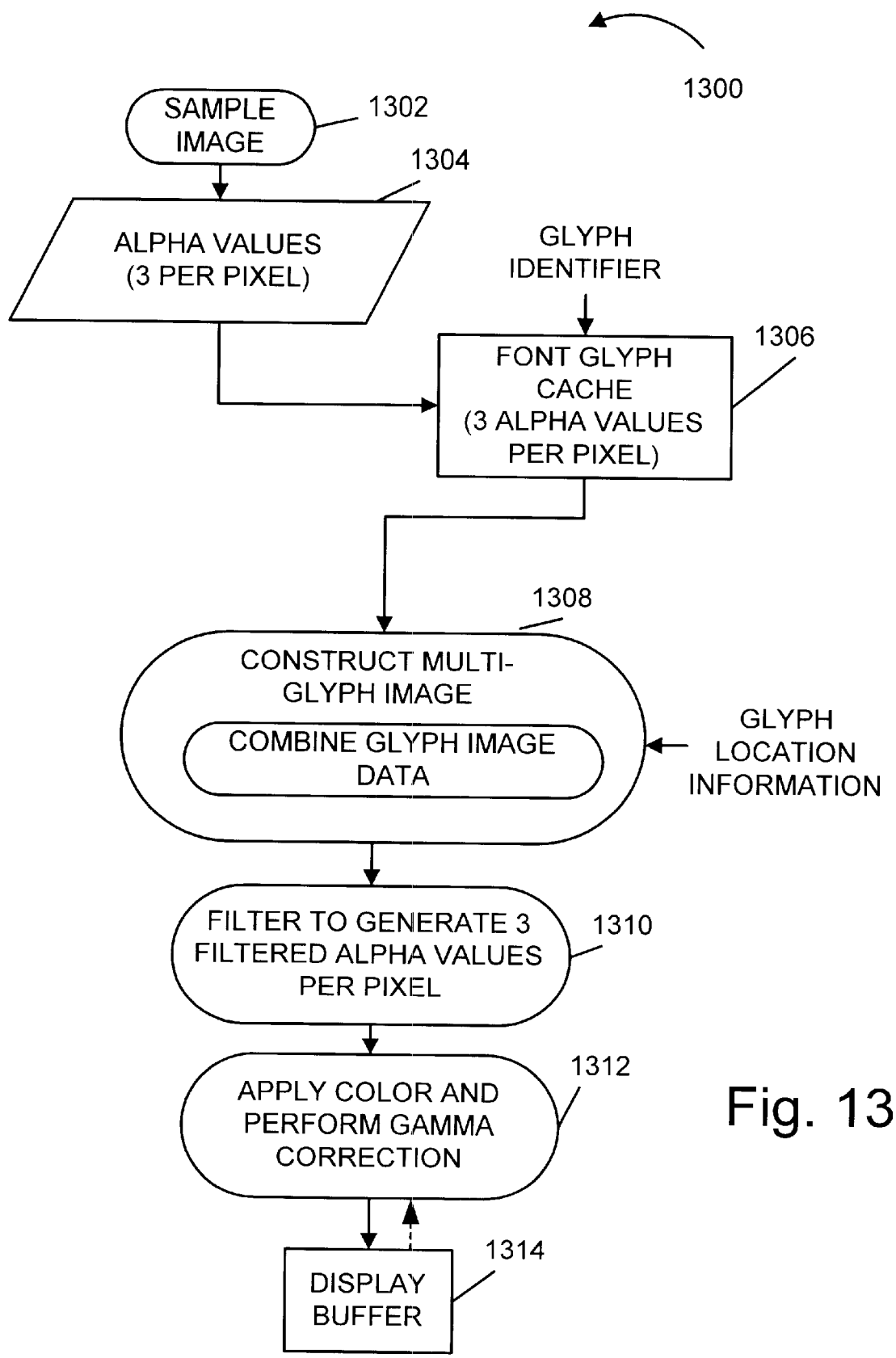
FIG. 13 illustrates a process of the present invention for rendering and displaying glyphs, which are filtered as part of the illustrated process, after being output from the glyph cache.

FIG. 13 illustrates an exemplary character display process 1300 of the present invention which involves post glyph cache filtering. As illustrated the process 1300 begins with the sampling of an image in step 1302, e.g., at a rate of 6 samples per source image pixel area in the horizontal direction. Each pair of source image samples are summed as part of the FIG. 13 sampling step 1302 to produce 3 intermediate alpha values 1304 per source image pixel area. The intermediate alpha values representing the sampled character image are then stored as part of a character glyph in the glyph cache 1306.

In response to the receipt of a glyph identifier, e.g., from the glyph controller 820, the font glyph cache 1306 outputs the stored glyph corresponding to the received identifier. The glyph is supplied to step 1308 wherein the data from sequentially received character glyphs is combined to form larger images, e.g., text strings, as a function of glyph location information which may be from, e.g., the application displaying text or from the glyph cache controller 820.

The combination of glyph image data may be accomplished by writing the data, e.g., alpha values, from each received glyph into a buffer as a function of glyph location and/or character spacing information. The utilized buffer includes a plurality of memory locations corresponding to pixel or pixel sub-component locations. Data from a subsequently received glyph which corresponds to the same image portion of a previously received glyph, e.g., an overlapped image portion, can be allowed to overwrite the data from the previously received glyph which corresponds to the same image portion. Alternatively, alpha values from multiple glyphs corresponding to the same image portion may be combined to form one alpha value for the image portion which is then stored in the buffer. The buffered data representing the constructed multi-glyph image is output to step 1310.

The image data output by step 1308, representing multiple glyphs, is filtered in step 1310 using box filters, in the manner described above in regard to FIG. 11. Alternatively, they may be filtered using any linear filters which do not span more than 3 full pixels. The filtering performed in step 1310 generates 3 filtered alpha values per pixel, i.e., one filtered alpha value for each the R, G, and B pixel sub-components of a pixel. Since glyphs are combined prior to the application of filtering, the correct data is available for both sides of a glyph boundary at the time filtering is applied in the FIG. 1300 process.

The filtered alpha values are supplied to step 1312 wherein foreground/background color is applied and gamma correction processing is performed. As will be discussed below, the particular method by which this step is performed depends on whether transparent or opaque fonts are being applied.

Once foreground/background color is applied to the filtered alpha values using color blending techniques, and gamma correction is performed, the resulting gamma corrected R, G, and B luminous intensity values are stored in the display buffer 1314 for use in controlling the output of display device 754.

While the first filtering embodiment, which involves post-cache filtering, is relatively straight forward to implement, it has the disadvantage of requiring that glyphs be filtered each time they are output from the glyph cache 1306, i.e., each time they are going to be displayed.

Figure 14:
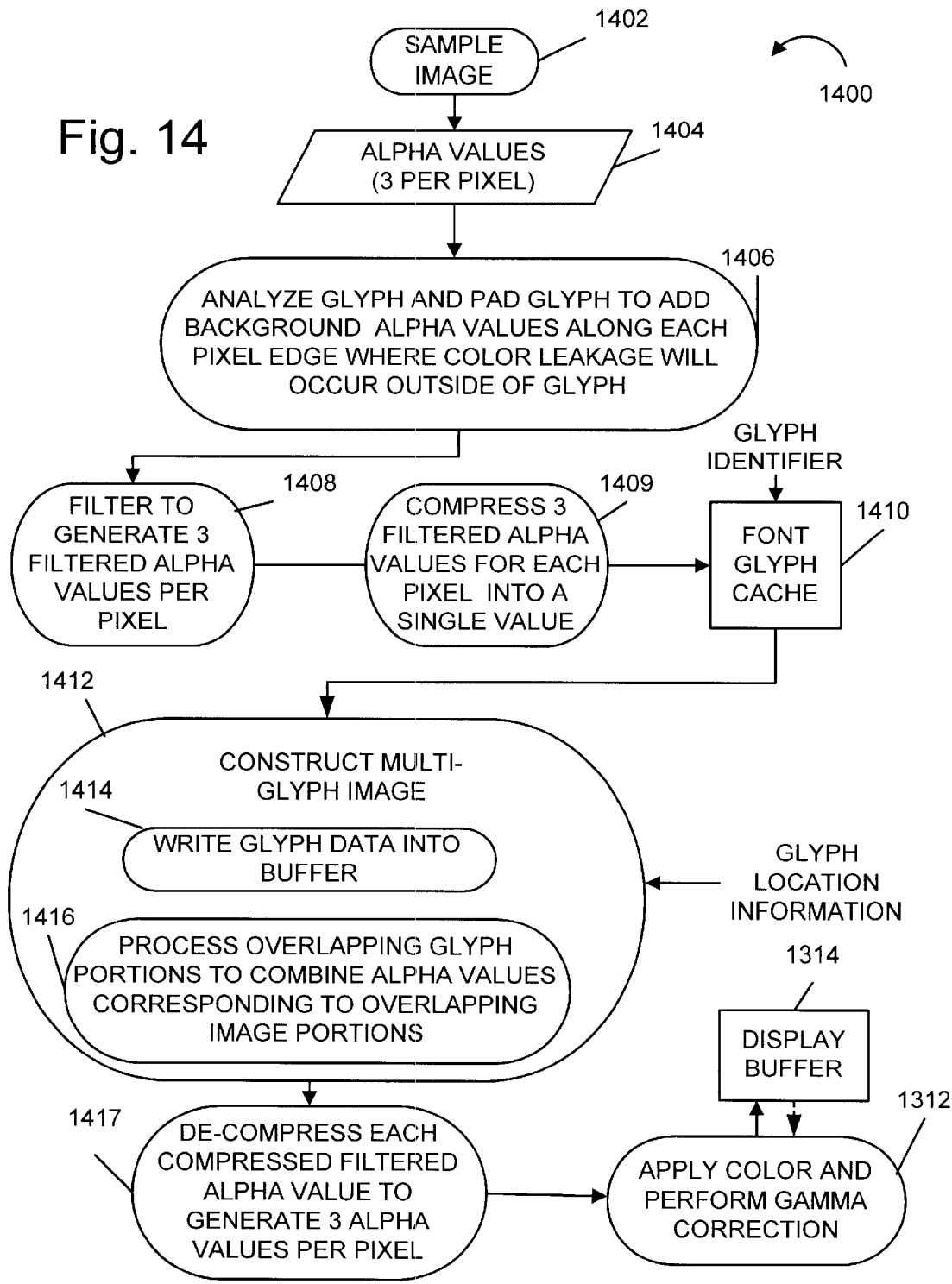
FIG. 14 illustrates a process of the present invention for rendering and displaying glyphs, which are filtered as part of the illustrated process, prior to being stored in the glyph cache.

As discussed above, the second filtering embodiment of the present invention supports filtering of glyphs prior to caching. An exemplary character display process 1400 of the present invention which involves pre-cache glyph filtering is illustrated in FIG. 14.

In such embodiments, since glyphs are filtered prior to caching, filtered alpha value information is stored in the glyph cache in compressed or uncompressed form, as opposed to intermediate alpha value information. Notably, the intermediate alpha value filtering of the present invention is color independent since it is performed in the alpha space prior to the application of foreground/background colors. Accordingly, filtering need not be repeated even if the utilized foreground/background colors are changed. This fact, combined with the glyph edge padding and post cache processing techniques of the present invention, discussed below, allow pre-glyph cache glyph filtering to be employed.

Pre-cache glyph filtering has several advantages over post-cache filtering. First, filtering of the entire character glyph is not repeated each time the character glyph is incorporated into a new text string. Thus, processing requirements are reduced as compared to systems which filter entire images formed from cached glyphs each time a new image is generated. Second, when text is rendered at an angle, the entire image which includes the angled text, need not be filtered. Thus, processing can be reduced by eliminating the need to filter non-text background portion of images which include angled text.

Character glyphs are filtered independent of one another in the pre-cache filtering case. Accordingly, in such an embodiment, it is not possible to take into consideration the effect of neighboring character glyphs on the edges of the glyphs being filtered at filtering time. Thus, while pre-cache filtering of character glyphs is attractive for the above discussed reasons, color leakage along character edges presents a problem.

In accordance with one feature of the present invention, pre-cache glyph filtering of character glyphs is employed with post cache processing of pixels immediately adjacent vertical glyph edges to take into consideration color leakage across glyph boundaries.

The process 1400 is exemplary of a display process which uses pre-cache filtering of character glyphs followed by post cache processing of pixels along vertical edges to take into consideration color leakage across glyph boundaries.

As illustrated in FIG. 14, the process 1400 begins with the sampling of an image in step 1402, e.g., at a rate of 6 samples per source image pixel segment in the horizontal direction. Each pair of source image samples is summed as part of the sampling process. Thus, the six samples per image source area produce 3 intermediate alpha values 1404 per source image pixel area. The intermediate alpha values representing the sampled character are then processed in step 1406.

In step 1406, each scan line, e.g., the data corresponding to a row of pixels, is sampled and analyzed to determine if there will be color leakage into a neighboring glyph as a result of content of the scan line and the filtering, e.g., box filtering of intermediate alpha values, employed at the edges of the scan line. Padding of the scan lines of a glyph is then selectively applied by adding a set of data representing a background colored pixel (all pixel alphas=0) to the vertical edge of the glyph on the side or sides where color leakage will occur. When no color leakage will occur from a side of a glyph padding is not needed. Accordingly, in one embodiment padding is not performed on sides of glyph from which there will be no color leakage.

As an alternative to analyzing the character glyph to detect edge points where color leakage will occur into a neighboring character glyph and selectively padding the edges, both vertical edges of a character glyph can be padded, e.g., with a column of background colored pixels. While this approach eliminates the need to analyze the content of character edges, it increases the amount of post cache edge processing since an entire row of pixels on each side of a glyph edge will have to be processed for each vertical character glyph edge as opposed to only those edges where color leakage occurs.

By reviewing the above described box filtering formulas, it is clear that when these formulas are applied 1) leakage to the left of a vertical glyph edge occurs only when an unfiltered image has a non-zero red pixel sub-component alpha value in the left most pixel of a scan line; and 2) leakage to the right of a vertical glyph edge occurs only when an unfiltered image has a non-zero blue pixel sub-component alpha value in the right most pixel of a scan line.

Accordingly, in the selective padding embodiment, padding is applied to the left of a glyph's scan lines when the first alpha value of any one of the scan lines, e.g., the red pixel sub-component alpha value of the left most pixel, has a non-zero value. In addition, padding is applied to the right of a glyph's scan lines when the last alpha value in any one of the scan lines, e.g., the blue pixel sub-component alpha value of the right most pixel, has a non-zero value. Absent the occurrence of one or both of these two padding cases, the scan lines of a character glyph are not padded in the selective padding embodiment.

Notably, in the selective padding embodiment, approximately 80% of commonly used character glyphs require no padding at the text display sizes commonly used in handheld computing devices.

Padding is accomplished in step 1406 by adding to the character glyph data representing each row of pixels, at least one intermediate alpha value representing a background colored pixel sub-component. However, to facilitate processing at a pixel level, three intermediate alpha values (0, 0, 0) corresponding to a background colored pixel are normally added, as required in the selective padding embodiment, at the start and/or end of each row depending on whether the left edge, right edge, or both edges of the character glyph are to be padded.

Figure 15:
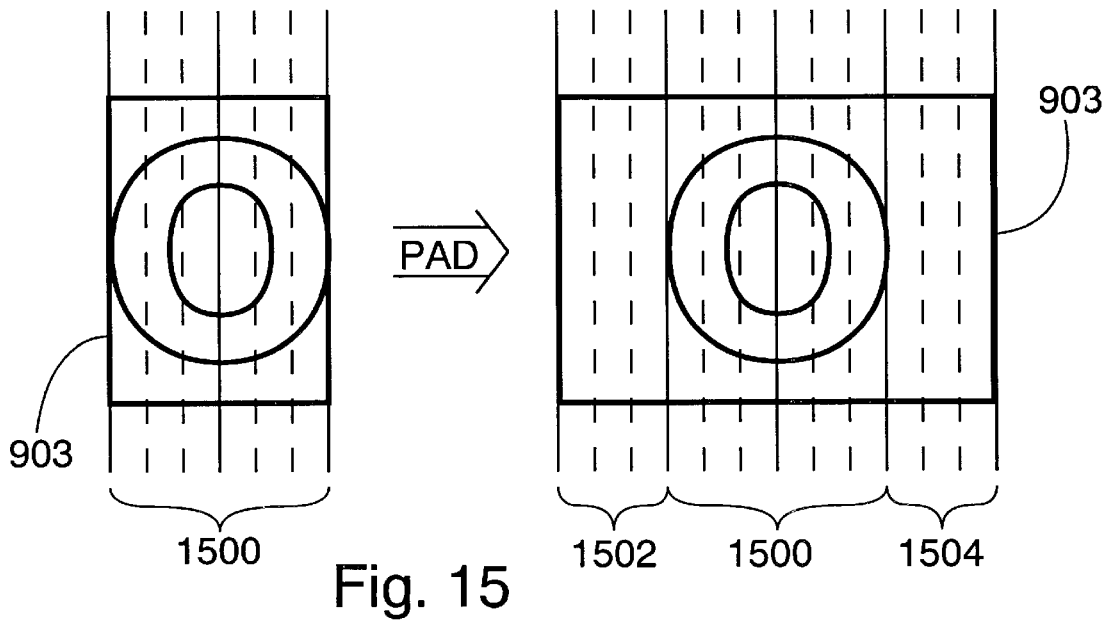
FIG. 15 illustrates an image padding operation performed prior to filtering in accordance with various embodiments of the present invention.

FIG. 15 illustrates the padding of character glyph 903 to add a background colored region one pixel wide to each side of the character glyph. As illustrated, the character glyph 903 is originally two pixels wide, as indicated by the horizontal area indicated by bracket 1500, and does not include a one pixel wide background color border on either the left or right side of the character glyph. As a result of padding character glyph 903 in step 1406, a one pixel wide background border 1502 is added to the left of the character glyph 903 and a one pixel wide background border 1504 is added to the right of character glyph 903. Thus, the character glyph is transformed from being 2 pixels wide to being 4 pixels wide for purposes of pre-cache filtering.

In accordance with the present invention, character size and spacing information, e.g., side bearing point and advanced width values, included in the character glyph data, are not changed as part of the padding operation. Thus, columns of pixels which are added via the padding operation will overlap pixels of character glyphs which are placed next to the padded character glyph. As will be discussed below, this means that two filtered alpha values will exist for each pixel sub-component where a character glyph overlap occurs due to padding. In accordance with the present invention, filtered alpha values corresponding to overlapping portions of a glyph are summed as part of the processing in step 1416. That is, overlapping R, G, B pixel sub-component filtered alpha values are summed (in step 1416) together to produce the filtered alpha values which are used to represent the image or the whole character string.

The character glyph alpha values output by step 1406 are filtered in step 1408 to generate R, G, and B pixel sub-component filtered alpha values, i.e., three filtered alpha values per pixel. To reduce data storage requirements, the three alpha values per pixel are compressed in step 1409 to a single compressed value in the range of 0–114.

Data compression in step 1409 may be implemented using a look-up table having 3^5=243 entries, each entry including a number from 0–114 which uniquely represents the one of the possible filtered alpha value triplets to which the entry corresponds. Thus, for each alpha value triplet input to the look-up table a compressed value in the range of 0–114 is output. As discussed above, one compressed value is generated for each pixel. A compressed value of 0 indicates that a pixel is a background color pixel.

The compressed value, generated for each pixel, which represents in compressed form, 3 filtered alpha values, is stored as part of the filtered character glyph in the font glyph cache 1410. While the filtering and data compression steps 1408, 1409 are illustrated as separate operations, they can be implemented as a single look-up operation using the image filtering look-up table 1200 which can output, in response to intermediate alpha value inputs, a single compressed value CK(F), representing three filtered alpha values.

Having described the glyph generation and storage portion of display process 1400, the glyph display phase will now be described.

The glyph display phase begins with the receipt of a glyph identifier by the font glyph cache 1410. In response, the font glyph cache 1410 outputs the stored glyph, e.g., the compressed values, corresponding to the received identifier. The glyph is supplied to step 1412 wherein the data from sequentially received character glyphs is combined to form larger images, e.g., text strings, as a function of glyph location information which may be from, e.g., the glyph cache controller 820.

Step 1412 includes two sub-steps, sub-step 1414 and sub-step 1416. Sub-step 1414 involves the writing of the glyphs received from the glyph cache 1410 into a buffer as a function of the received glyph location information and/or character spacing information included in the received glyphs. Sub-step 1416 involves the step of processing overlapping image data resulting from the combining of multiple glyphs according to the supplied character spacing information. In step 1416, filtered alpha values corresponding to overlapping image locations are summed to produce the filtered alpha values used in the combined image for the overlapping image locations.

The buffer used for combining glyphs may be part of memory 722 and is large enough to store an entire set of compressed values for a string of glyphs which is currently being processed. Memory locations in the buffer correspond to pixel display screen locations. The buffer memory locations are initialized to 0 each time a string of glyphs is being processed for display. Accordingly, prior to writing glyph data into the buffer, the buffer memory contents are all set to background values (0).

As glyph data is received, the compressed values corresponding to each pixel are written into the buffer at the memory location corresponding to the pixel to which the compressed value corresponds. Prior to writing a compressed value into a memory location, the contents of the location are examined. If the contents are zero, the compressed value is written into the corresponding buffer memory location. However, if the contents are non-zero, indicating an overlap in glyphs, further processing is required.

As subsequent glyphs are received from the glyph cache, overlapping portions of glyphs may be encountered. This will result in the accessing of non-zero buffer memory locations. A non-zero memory location content indicates that a compressed value corresponding to a previously received glyph is already stored in the memory location and that there is a glyph overlap.

In the case of a glyph overlap, the contents, e.g., compressed value stored in the memory location to which the current glyph value was to be written, is decompressed to produce three filtered alpha values corresponding to a pixel. In addition, the compressed value, corresponding to the most recently received glyph, that was to be written into the memory location, is decompressed. The decompression steps are performed using an inverse look-up table which, in response to an input of a value in the range of 0–115, produces three filtered alpha values.

The three alpha values of the previously received glyph are summed with the corresponding three alpha values of the most recently received glyph to produce three filtered alpha values representing the overlapping image portion. If the sum of any of the alpha values exceeds the maximum permitted alpha value, e.g., 6 in the exemplary embodiment, the summed alpha value is clipped to the maximum permitted alpha value. That is, the red, the green, and the blue pixel sub-component filtered alpha values of the current glyph are summed with the red, green and blue pixel sub-component alpha values of the previously received glyph, respectively, to produce a single set of red, green and blue pixel sub-component alpha values for the overlapping pixel. Clipping is only required in those rare cases where characters intentionally overlap since overlapping due to the edge padding of the present invention will not produce alpha values exceeding the maximum permitted value.

In the case where padding of a vertical glyph edge is responsible for the overlap, as will be discussed below, the summation of the filtered alpha values produces the correct filtered alpha value for the overlapped image location, i.e., the resulting filtered alpha value properly takes into consideration color leakage across glyph boundaries resulting from the filtering operation.

Summing of overlapping alpha values for image areas which overlap for reasons other than the padding operation discussed above, e.g., due to intentional character overlaps, may result in some errors in the generated filtered alpha values. However, intentional overlapping of text is rarely used since it makes the text difficult to read. Furthermore, empirical tests have shown that in cases where text character overlap occasionally due to spacing issues, the impact on overall image quality is usually not significant. Thus, the padding and alpha value summing technique of the present invention provides, in a computationally efficient manner, the correct filtering results for cases where characters abut one another or do not overlap, and provides acceptable results in those infrequent cases where characters do in fact overlap.

Once the 3 alpha values are generated for a pixel which corresponds to an overlapping glyph condition, the resulting alpha values are compressed, e.g., as discussed above in regard to step 1409 in the case of non-clipped values, to generate a compressed value.

As a result of the clipping operation, it is possible that an alpha value triplet may be generated which does not occur due to normal filtering. Under such circumstances, the three generated alpha values are compressed by selecting the closest of the 115 possible results from box filtering, and the corresponding one of the values in the range of 0–114 is generated as a result of performing compression on the triplet. This selection of a closest filtering result is implemented via the same compression look-up table described in step 1409.

The compressed value generated in the above manner, is written into the memory location corresponding to the pixel representing an overlapping portion of the glyphs.

Once a multi-glyph image is constructed as described above, the compressed values representing the generated image, one for each pixel, are output to decompression step 1417. In decompression step 1417, a reverse look-up table is used to convert each compressed value in the range of 0–114 back into 3 filtered alpha values. The 3 filtered alpha values corresponding to each pixel are then supplied to color application and gamma correction step 1312.

In step 1312 foreground/background color is applied and a gamma correction operation is performed on the multi-glyph image represented by sets of R, G, B pixel sub-component filtered alpha values, output by decompression step 1417.

Background image data may be obtained, in the case of transparent character glyphs, from display buffer 1314 as indicated by the arrows with the dashed line leading from display buffer 314 to step 1312. The gamma corrected R, G, B pixel sub-component luminous intensity values generated for each image pixel in step 1312, are stored in the display buffer 1314 for subsequent use in controlling the display.

Figure 16:
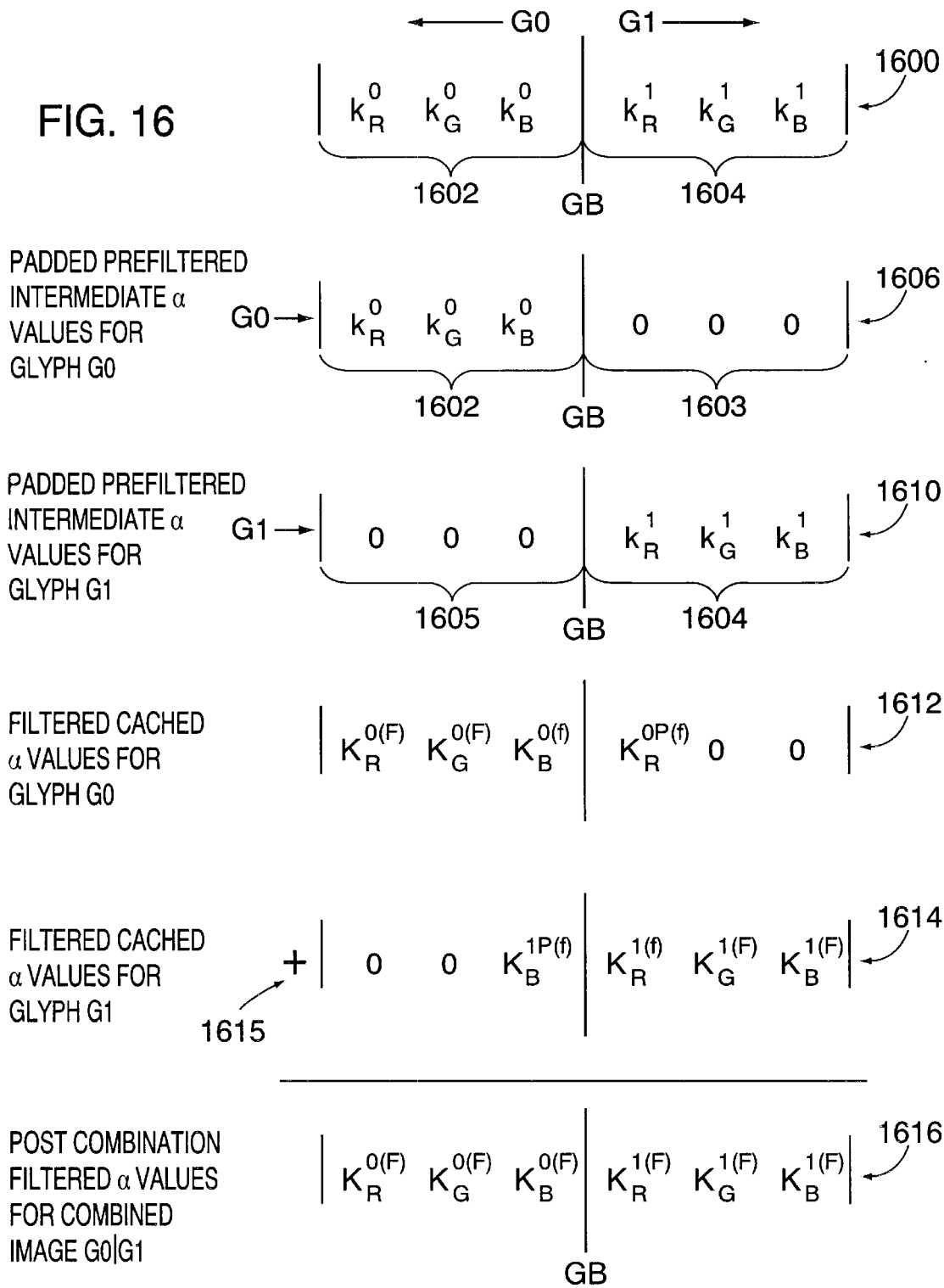
FIG. 16 illustrates image edge padding, filtering and post glyph cache combining of filtered alpha values from different glyphs in accordance with the present invention.

The padding, pre-cache filtering and subsequent processing of overlapping glyph edges to complete the filtering process of the present invention will now be described with reference to FIG. 16. Row 1 of FIG. 16, indicated by the reference numeral 1600, illustrates two sets of intermediate alpha values 1602, 1604 corresponding to border pixels of a first glyph G0 and a second character glyph G1. The letters GB denote the glyph boundary.

In accordance with the present invention, assuming that character glyphs G0 and G1 do not include right and left background borders one pixel wide, respectively, they will be padded. Row 1606 illustrates the padding of the right side of glyph G0 to added a one pixel wide background border, i.e., the intermediate set of alpha values 1603. Note that each of the three intermediate alpha values in pixel segment 1603 are set to zero, indicating that the pixel segment 1603 corresponds to a background image portion.

Row 1610 illustrates the padding of the left side of glyph G1 to added a one pixel wide background border, i.e., the intermediate set of alpha values 1605 is added. Note that each of the three intermediate alpha values in pixel segment 1605 are set to zero, indicating that the pixel segment 1605 corresponds to a background image portion.

Rows 1612 and 1614 illustrate the effect of performing the above described block filtering on the intermediate alpha values illustrated in rows 1606 and 1610, respectively. As discussed above, the filtering involves summing three intermediate alpha values to produce a filtered value. The illustrated pre-cache filtering result assumes that the intermediate alpha values adjacent the illustrated pixel are within the glyphs G0 and G1 and are available at the time the glyphs are filtered. The illustrated pre-cache filtering result also assumes that intermediate alpha values outside the padded glyph being filtered are zero.

In rows 1612, 1614 superscript 0 is used to indicate a value corresponding to glyph G0 while a 1 in the superscript is used to indicate a value corresponding to glyph G1. A P in the superscript is used to indicate a value corresponding to a pixel segment added through the use of padding. A large F in the superscript is used to indicate a filtered value which should be unaffected by the subsequent overlapping of glyph edges, e.g., a final filtered value. A small f in the superscript is used to indicate a filtered value which is likely to be subject to further processing as a result of an overlapping edge condition.

In row 1612, the filtered values $K_B^{0(f)}$ and $K_R^{0P(f)}$ are as follows:

$$K_B^{0(f)} = k_G^0 + k_B^0 + 0$$

$$K_R^{0P(f)} = k_B^0 + 0 + 0$$

In row 1614, the filtered values $K_B^{1P(f)}$ and $K_R^{1(f)}$ are as follows:

$$K_B^{1P(f)} = 0 + 0 + k_R^1$$

$$K_R^{1(f)} = 0 + k_R^1 + k_G^1$$

Since character image spacing and positioning information is left unadjusted by the padding operation, the cached filtered alpha values resulting from the padded pixels will overlap the edge pixels of the neighboring character glyph assuming the character glyphs would normally abut one another absent the padding. As discussed above, in step 1516 filtered alpha values corresponding to overlapping image portions are summed to produce a single alpha value for the overlapped image portion.

Filtered alpha values in rows 1612 and 1614 which will correspond to the same image portions when the filtered glyphs G0 and G1 are combined are shown in vertical columns. The plus sign 1615 indicates the summing operation performed in step 1416. The resulting post combination filtered alpha values produced along the glyph boundary are shown in row 1616.

In row 1616, the filtered alpha values $K_B^{0(F)}$ and $K_R^{1(F)}$ are as follows:

$$K_B^{0(F)} = K_B^{0(f)} + K_B^{1P(f)} = k_G^0 + k_B^0 + k_R^1$$

$$K_R^{1(F)} = K_R^{0P(f)} + K_R^{1(f)} = k_B^0 + k_R^1 + k_G^1$$

Note that these values are identical to those which would have resulted had the glyphs G0 and G1, represented by intermediate alpha values, been combined and then filtered using the above described intermediate alpha value filtering technique. Also note that the above described padding, filtering and overlapping edge technique of the present invention can be applied to general linear filters, e.g., triangular filters, etc., which are less than three pixels wide or even wider assuming more than one pixel of background padding is applied along the vertical edges of glyphs.

When the above described filtering and display techniques are applied to certain fonts having narrow character stems, such as, e.g., Courier New, the resulting displayed characters can appear gray, assuming black text on a white background and can appear without significant contrast. This is understandable given the filtering applied during the display process. Given the above described filtering process, if a character is very thin, e.g., ⅙ of a pixel wide at a particular scan line, then only one sample of the six times over-sampled scan-line will be "on", e.g., correspond to the foreground color. This sample, after the filtering, will produce alpha values that are no more than 1 (on a scale from 0–6). If the background is white and the foreground is black, the pixel representing the character will not be more than ⅙ gray. This can be hard to read. Accordingly, in the case of thin stemmed fonts, the improved resolution associated with treating pixel sub-components as independent luminous sources may make the characters thinner than is desirable.

One way to address this problem would be to re-design the gray fonts such as Courier New, to be thicker than they presently are. However, re-designing fonts requires a significant investment in font designer time which can be extremely expensive. Another disadvantage of changing the font sets is that while broadening the font stems may improve appearance on LCD displays, it may result in overly thick character stems on CRT displays where, depending on the character display implementation, pixel sub-components may not be treated as independent luminous intensity sources.

One feature of the present invention is directed to addressing the contrast problem associated with gray fonts without the need to re-design the fonts.

In order to enhance the contrast of fonts which tend to gray, it is desirable to slightly widen or "bloat" the foreground portions of character glyphs that are associated with the gray or font contrast problem mentioned above. Since the gray character font problem associated with thin-stemmed character fonts, such as Courier New, does not occur in the majority of fonts, it is desirable that the bloating of characters in accordance with the present invention be applied selectively.

In one embodiment, information in the GASP table 807, which indicates the point size at which character stem widths will increase from one pixel to two pixels in width, is used to determine which fonts should be subject to bloating in accordance with the present invention and which should be rendered without bloating. In one embodiment, the bloating is applied to all characters of a font which is subject to bloating.

Most fonts change stem widths from one to two pixels at point sizes in the range of 12–16 points. In the case of Courier New, a thin stem character font subject to the gray font problem discussed above, stem widths change from one pixel in width to two pixels in width at about a point size of 27 or 28 points. The large distinction in the character stem size transition points provides information which can be used to identify thin stemmed fonts which could benefit from the character bloating technique of the present invention and to distinguish fonts which might be adversely impacted by bloating.

In one particular exemplary embodiment, characters glyphs which correspond to character fonts with stem widths that transition from one to two pixels in size above a pre-selected threshold are subject to bloating while others are not. In one exemplary embodiment, the threshold is set to 20 points. Thus, characters which correspond to fonts which the GASP table 807 indicates are to transition from one to two pixel wide stems above the size of 20 points, e.g., Courier New, are subject to bloating while others are not.

Suitable rules for bloating portions of character glyphs, to which bloating is to be applied, are shown in table 1700 of FIG. 17. The illustrated rules are intended to be applied to intermediate alpha values which have been generated by originally over-sampling each source image pixel segment by a factor of 6 and then summing pairs of samples to produce 3 intermediate alpha values per source pixel segment. The left side of table 1700 illustrates input intermediate alpha values and, in some cases a condition associated with an input alpha value. The right side of table 1700 illustrates the intermediate alpha value to be substituted for the intermediate alpha value shown on the left, provided that the condition, if any, associated with the input alpha value is satisfied.

Intermediate alpha values to the exemplary bloating step of the present invention may assume the values of 0, 1, or 2. Based on the rules illustrated in table 1700, intermediate input alpha values to the bloating step of the present invention of 1 and 2 result in an output intermediate alpha value of 2. Intermediate input alpha values of 0 when located next to an intermediate alpha value of 2 result in a output intermediate alpha value of 1. In addition, intermediate input alpha values of 0 when NOT located next to an intermediate alpha value of 2 result in a output intermediate alpha value of 0.

Figure 18:
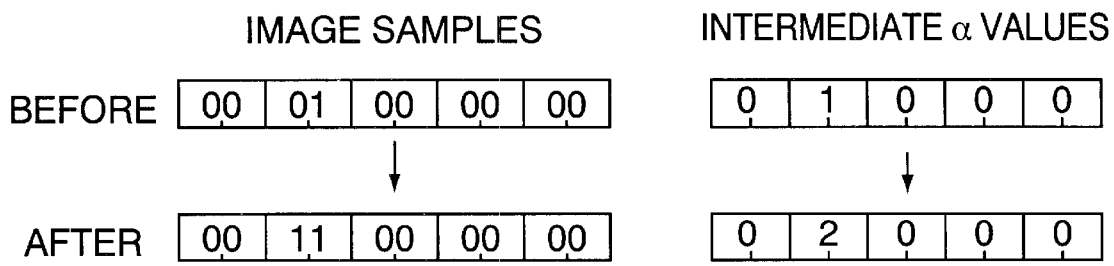
FIGS. 18–20 illustrate the effect of the image bloating rules included in the table of FIG. 17 on various sets of input data.
Figure 19:
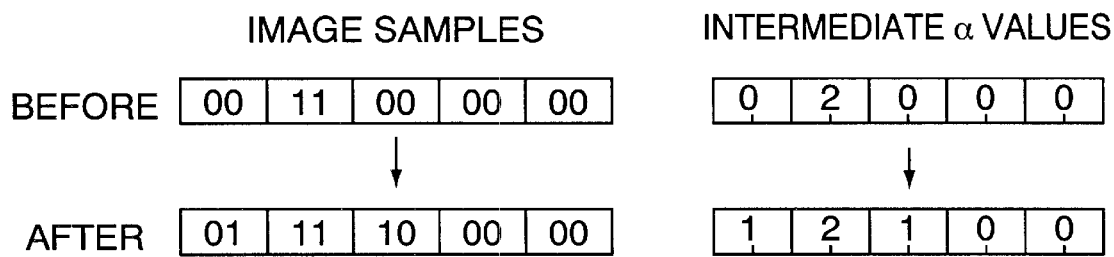
Figure 20:
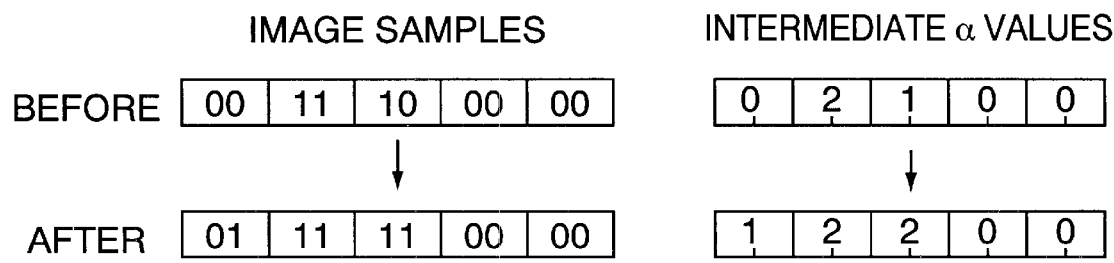

FIGS. 18, 19 and 20 illustrate the application of the bloating rules of the present invention to various exemplary input sets of image samples and intermediate alpha values. On the left side of each of FIGS. 18, 19, and 20 the application of the bloating rules to an input set of image samples, six per source pixel segment and the resulting processed images samples are shown. On the right side of each of FIGS. 18, 19, and 20 the application of the bloating rules to an input set of intermediate alpha values, each alpha value representing the sum of two image samples, is shown. The input alpha values is shown at the top right-hand portion of each of the figures and the intermediate alpha values resulting from the application of the bloating rules is shown on the lower right-hand side of each of FIGS. 18, 19, 20.

Figure 21:
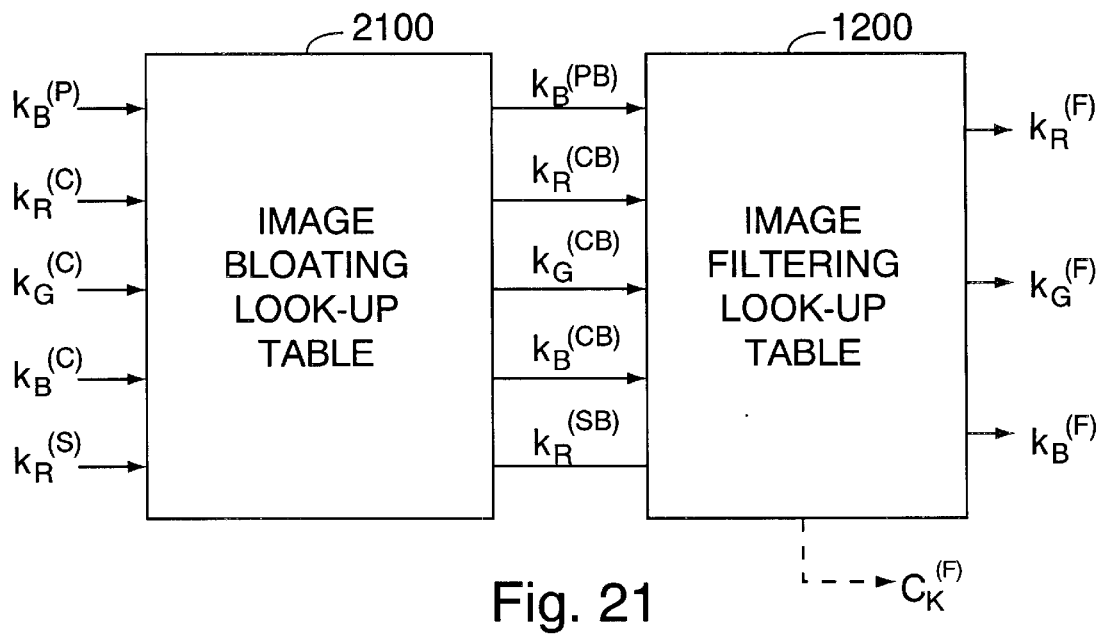
FIG. 21 illustrates how the application of the image bloating rules of the present invention and the image filtering operations of the present invention can be implemented through the use of successive look-up tables.

The bloating rules illustrated in table 1700 may be implemented using a look-up table. FIG. 21 illustrates an image bloating look-up table 2100 which outputs intermediate alpha values resulting from applying the above bloating rules, through a look-up operation, to input intermediate alpha values. The look-up table 2100 is generated by applying the image bloating rules of table 2100 to each possible set of intermediate alpha values which may be input to the table 2100. The resulting sets of processed intermediate alpha values, one for each possible input set of alpha values, are stored in the table 2100. Thus, there is one corresponding set of processed alpha values stored in the look-up table 2100 for each possible set of input intermediate alpha values. In response to the receipt of an input set of intermediate alpha values, the corresponding stored set of processed alpha values is output by the image bloating look-up table 2100.

The intermediate alpha values generated by the image bloating look-up table 2100 can subsequently be filtered to produce a set of filtered alpha values, e.g., at a rate of 3 per pixel. The filtering operation may be implemented using an image filtering look-up table 1200 which produces filtered alpha values in response to the input of intermediate alpha values. In FIG. 21, the letter B included in the superscript of the input intermediate alpha values supplied to filter table 1200 indicates the input alpha values have been processed according to the bloating rules of FIG. 1700.

For fonts which are not subject to bloating, the image bloating table 2100 may be bypassed and the intermediate alpha values supplied directly to image filtering look-up table 1200.

Figure 22:
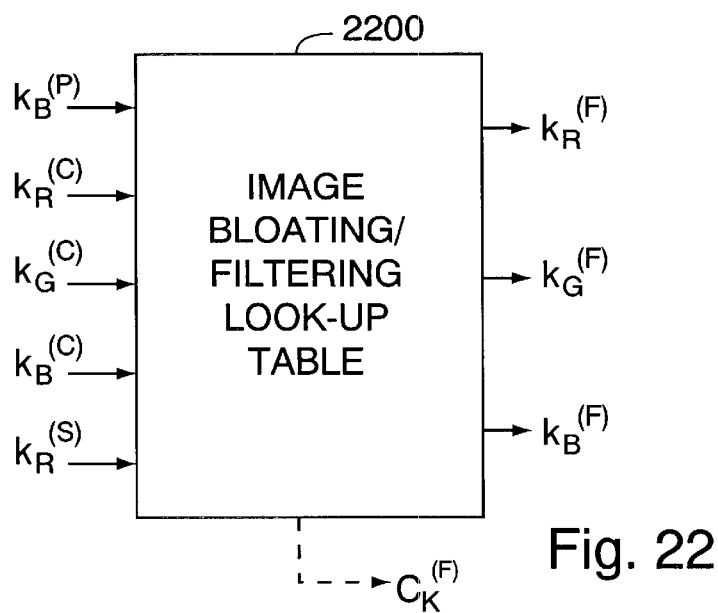
FIG. 22 illustrates how the application of image bloating rules and image filtering can be performed using a single look-up table.

Rather than use two sequential look-up tables, it is possible to combine the operation of the image bloating look-up table 2100 and the image filtering look-up table 1200 into a single image bloating and filtering look-up table 2200 as illustrated in FIG. 22. The image bloating and filtering look-up table 2200 applies performs both image bloating operations and filtering operations as part of a single look-up operation.

In one such embodiment, an image filtering look-up table 1200 is used to filter intermediate alpha values for fonts which are not subject to bloating while an image bloating/filtering look-up table 2200 is used to process intermediate alpha values corresponding to character glyphs subject to bloating.

Because the look-up table 2200 allows bloating and filtering operations to be performed in a single look-up operation, the processing required at display time to perform the bloating operation in addition to the filtering operation requires no more processing than performing the filtering operation alone. Accordingly, use of the combined bloating and filtering table of the present invention 2200 provides an easy and efficient way to adjust the weight of character fonts without having to modify the font or the hinting process associated therewith.

As discussed above, the display methods of the present invention illustrated in FIGS. 13 and 14 can be used to process opaque or transparent glyphs. In the case of opaque glyphs, uniform foreground and background colors are applied through the use of alpha blending in step 1312. In the case of transparent glyphs, a uniform foreground color is applied and a potential varying background color, corresponding to pixel values of a stored image upon which the glyph is to be placed, is applied. Thus, the use of transparent glyphs complicates the application of color in that the background color must be obtained for each pixel from an image buffer which stores the background image. In many cases, the background image used is the last displayed image, i.e., the image stored in the display buffer.

Figure 23:
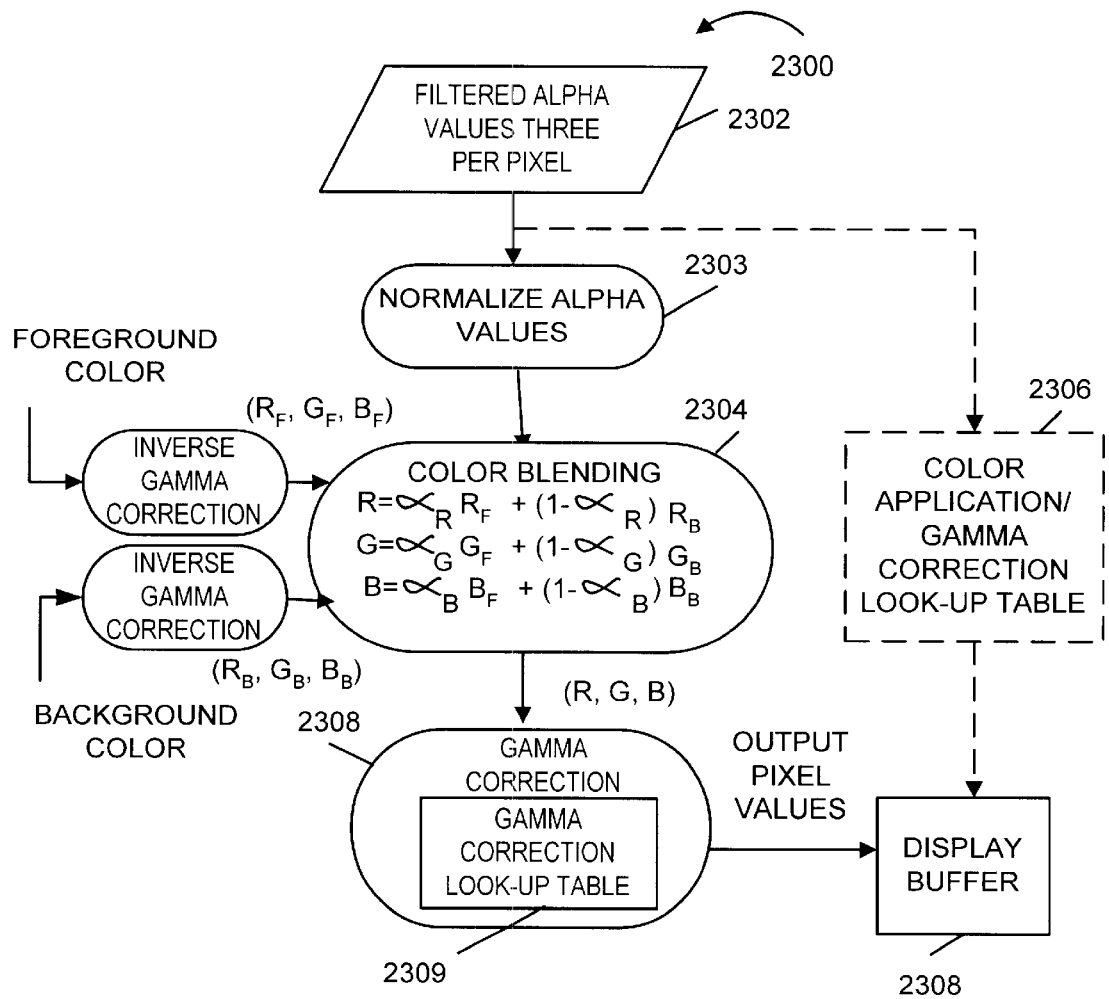
FIG. 23 illustrates a process for applying color and performing gamma blending in an exemplary opaque glyph embodiment of the present invention.

FIG. 23 illustrates a color application and gamma correction process 2300 of the present invention for use with opaque glyphs. Process 2300 may be used to perform the color application and gamma correction step 1312 of either the post glyph-cache filtering embodiment illustrated in FIG. 13 or the pre-glyph cache filtering embodiment illustrated in FIG. 14.

The color application and gamma correction process 2300 begins with the receipt of filtered alpha values, 3 per pixel. In step 2303, the filtered alpha values are normalized to a value between 0 and 1. In the exemplary embodiment, the filtered alpha values may assume a value in the range of 0 to 6. Accordingly, in such an embodiment, normalized alpha values are generated by dividing the filtered alpha values by 6.

The normalized alpha values produced in step 2303 serve as input to the color blending step 2304. In step 2304, foreground and background colors are applied. In the FIG. 23 embodiment, the foreground and background colors are specified by red (R), green (G) and blue (B) pixel sub-component luminous intensity values. A capital F subscript in FIG. 23 is used to indicate a foreground luminous intensity value while a capital B subscript is used to indicate a background luminous intensity value. The indicated foreground and background luminous intensity values used in step 2304 are non-gamma corrected (linear) values generated by applying inverse gamma correction operations 311, 313 to specified foreground and background luminous intensity values. If, however, the foreground and background colors are already specified in a non-gamma corrected (linear) color space, then the inverse gamma correction step should not be used.

Note that in color blending step 2304, the red, green and blue pixel sub-component luminous intensity values are each generated from a different one of the three normalized alpha values generated per pixel. This differs from the prior art discussed above, where the same alpha value is used for all the pixel sub-components of a pixel.

The red, green and blue pixel sub-component luminous intensity values generated in step 2304 are gamma corrected in step 2308. Gamma correction may be performed using gamma correction look-up table 2309 to generate R, G, and B gamma corrected luminous intensity values for each pixel. The gamma corrected RGB luminous intensity values are stored in the display buffer 2308 for use in controlling the display device to display the intended character images.

Box 2306, shown using dashed lines, represents an alternative to the separate alpha normalization, color blending, and gamma correction steps. For a given foreground and background color combination, alpha value normalization, color blending, and gamma correction operations may be performed for all supported filtered alpha value combinations. The results can be stored in a look-up table 2306 and then used to implement a color application and gamma correction operation through a single look-up table operation. The R,G,B luminous intensity values generated through the use of look-up table 2306 are stored in the display buffer as would be the values from gamma correction step 2309.

For even greater computational efficiency, when the process of FIG. 14 is being used for opaque glyphs, the functionality of decompression step 1417, can be merged into look-up table 2306 to provide a single look-up table which performs decompression, alpha value normalization, color blending, and gamma correction operations through a single look-up table operation. In such an embodiment the input to the single look-up table would be a single compressed alpha value per pixel, e.g., a value in the range of 0–114, and the output would be gamma corrected R, G, and B luminous intensity values resulting in three luminous intensity values per pixel.

As discussed above, the application of foreground and background colors and gamma correction differs in the transparent glyph case from that described above in regard to the opaque glyph case.

Figure 24:
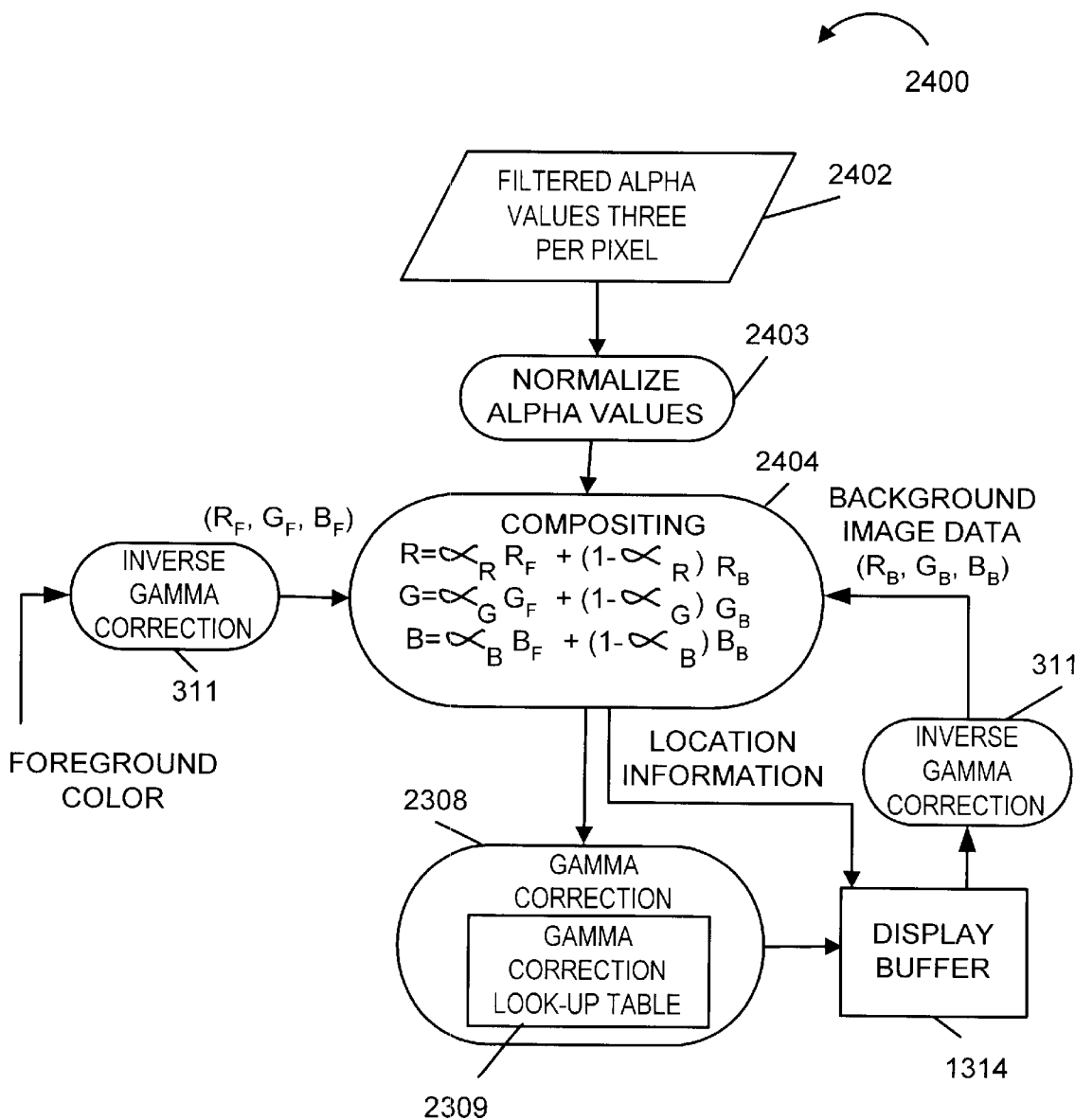
FIG. 24 illustrates a color application and gamma correction process of the present invention for use with transparent character glyphs.

FIG. 24 illustrates a color application and gamma correction process 2400 of the present invention for use with transparent character glyphs. Process 2400 may be used to perform the color application and gamma correction step 1312 of either the post glyph-cache filtering embodiment illustrated in FIG. 13 or the pre-glyph cache filtering embodiment illustrated in FIG. 14 when transparent characters are to be displayed.

The color application and gamma correction process 2400 begins with the receipt of filtered alpha values, 3 per pixel in step 2402. Then, in step 2403, the filtered alpha values are normalized to a value between 0 and 1. In the exemplary embodiment, the filtered alpha values may assume a value in the range of 0 to 6. Accordingly, in such an embodiment, normalized alpha values are generated by dividing the filtered alpha values by 6.

The normalized alpha values produced in step 2403 serve as input to the compositing step 2404. The term compositing is used to refer to a color blending operation which involves the use of a background image to supply the background color luminous intensity values used in the blending operation. In step 2404, foreground and background colors are applied. In the FIG. 24 embodiment, the foreground and background colors are specified by red (R), green (G) and blue (B) pixel sub-component luminous intensity values. A capital F subscript in FIG. 24 is used to indicate a foreground luminous intensity value while a B subscript is used to indicate a background luminous intensity value.

While the foreground color is a constant value, the background color depends on the content of the image which is used as the source of the background color information, e.g., the image stored in display buffer 1314. Foreground and background luminous intensity values used in step 2304 are non-gamma corrected values generated by applying inverse gamma correction operations 311, 313 to the specified foreground color values and the background luminous intensity values obtained from the portion of the image in display buffer 1314 which corresponds to the same pixel location of the pixel upon which the color blending operation 2404 is being performed.

Note that in color blending step 2304, the red, green and blue pixel sub-component luminous intensity values are each generated from a different one of the three normalized alpha values generated per pixel.

The red, green and blue pixel sub-component luminous intensity values generated in step 2404 are gamma corrected in step 2308. Gamma correction may be performed using gamma correction look-up table 2309 to generate R, G, and B gamma corrected luminous intensity values for each pixel. The gamma corrected RGB luminous intensity values are stored in the display buffer 1314 for use in controlling the display device to display the intended character images.

While gamma correction has generally been described in regard to the various embodiments of the present invention, as being applied in the RGB color space, e.g., in step 1312, it could be applied in the alpha color space. In such embodiments of the present invention, gamma correction is applied to the filtered alpha values. This may be done prior to caching of the filtered alpha values in pre-cache glyph filtering embodiments. Alternatively, gamma correction can be performed in the alpha color space after the filtered alpha values are output from the glyph cache or, in the post glyph cache filtering embodiments, after filtering of the intermediate alpha values output from the glyph cache.

Application of gamma correction in the alpha color space is less accurate than in the RGB color space but has the advantage of eliminating the need to perform an inverse gamma correction operation on foreground and background color luminous intensity values being used to apply color to the filtered alpha values. In addition, because it is applied in the alpha color space, in some cases it can be applied prior to caching of the character glyph thereby eliminating the need to perform gamma correction each time a character glyph is displayed.

Figure 25:
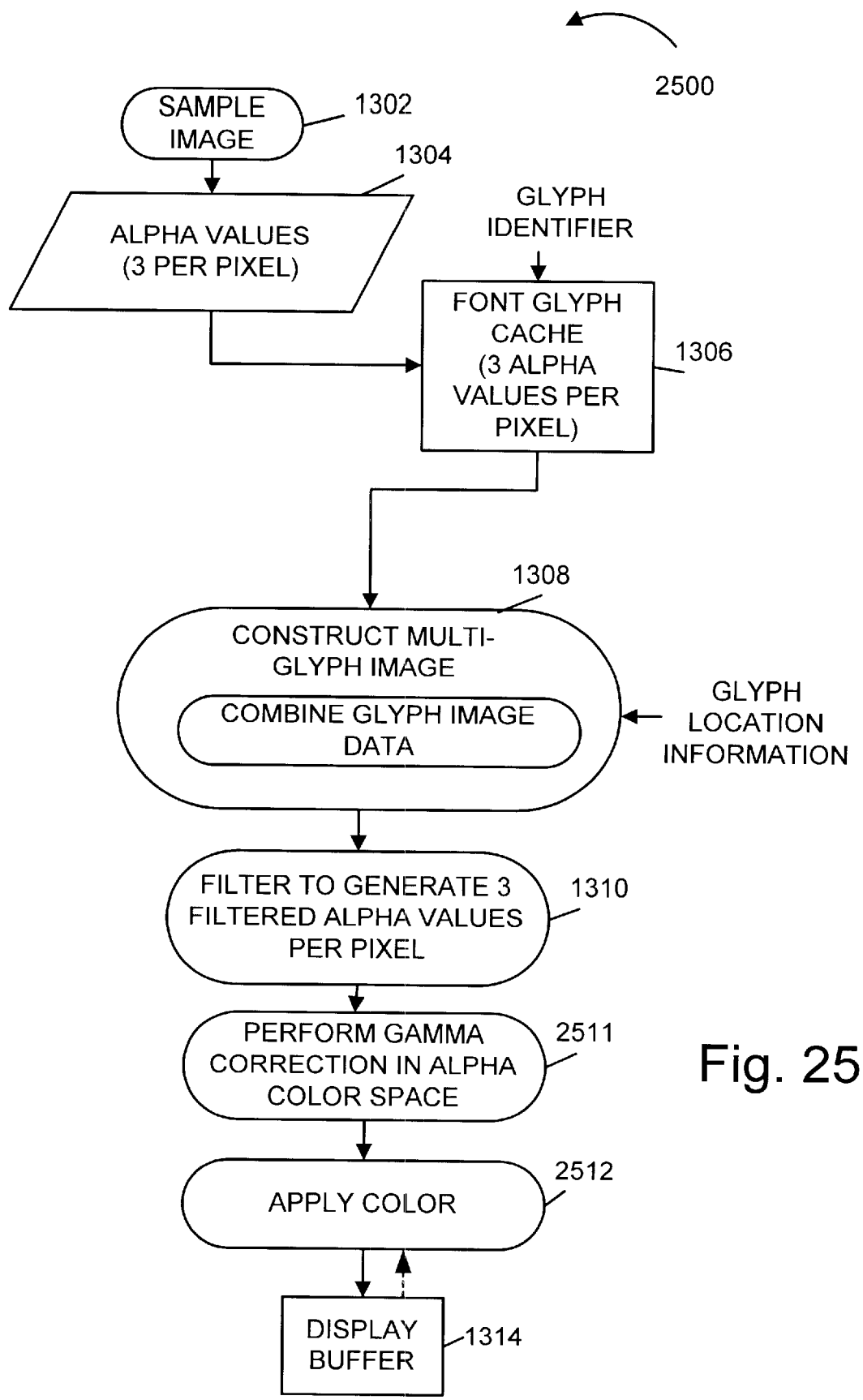
FIG. 25 illustrates a process for displaying character images which involves the use of post glyph cache filtering of character glyphs and the application of a gamma correction in alpha space.

FIG. 25 illustrates a process for displaying character images which involves the use of post glyph cache filtering of character glyphs and the application of a gamma correction in alpha space. Note that the FIG. 25 process 2500 is similar to the FIG. 13 process but for the fact that gamma correction is applied in the alpha space in step 2511. Color is then applied in step 2512 through the use of color blending techniques.

FIG. 26 illustrates a process 2600 for displaying character images which involves the use of pre-glyph cache filtering of character glyphs and the application of gamma correction in the alpha color space in step 2609 before caching of the filtered alpha values or, alternatively, in step 2609' after caching of the filtered alpha values. Note that the FIG. 26 process is similar to the FIG. 14 process but for the fact that gamma correction is applied in the alpha space prior to the application of color in step 2612 through the use of color blending techniques.

In view of the description of the invention included herein, numerous additional embodiments and variations on the discussed embodiments of the present invention will be apparent to one of ordinary skill in the art. It is to be understood that such embodiments do not depart from the present invention and are to be considered within the scope of the invention.

What is claimed is:

1. A method of processing image data for display, the method comprising:

receiving a plurality of glyphs, each glyph including a plurality of alpha values;

generating, from the received plurality of glyphs, a set of alpha values representing a string of glyphs; and filtering the set of alpha values to generate a set of filtered pixel sub-component alpha values including at least one filtered alpha value for each pixel sub-component used to represent the string of glyphs, at least one filtered pixel sub-component alpha value being generated from alpha values, included in the set of alpha values, corresponding to two different character glyphs.

2. The method of claim 1, wherein the glyphs are character glyphs, the method further comprising the steps of:

sampling a character source image to generate the alpha values included in each character glyph, each distinct character glyph being generated from a different character source image;

storing each character glyph including the generated alpha values in a glyph cache; and outputting from the glyph cache said plurality of glyphs.

3. The method of claim 2, wherein the character source image is a foreground/background outline representation of a character.

4. The method of claim 2, wherein each character source image includes a plurality of source image pixel segments which have an area corresponding proportionately in size to the area of a pixel of a display device used to display the character glyphs, said sampling including the act of sampling each source image pixel segment at a rate which is an integer multiple of the number of pixel sub-components included in each pixel of said display device.

5. The method of claim 2, further comprising:

performing a color blending operation using said filtered pixel sub-component alpha values as blend coefficients, using foreground color luminous intensity values, and using background color luminous intensity values, to generate red, green and blue pixel sub-component luminous intensity values.

6. The method of claim 5, wherein the color blending operation is performed using a look-up table.

7. The method of claim 5, further comprising:

performing a gamma correction operation on the red, green and blue pixel sub-component luminous intensity values generated by the color blending operation to produce gamma corrected red, green and blue pixel sub-component luminous intensity values; and storing the gamma corrected red, green and blue pixel sub-component luminous intensity values in a display buffer.

8. The method of claim 7, further comprising the step of:

retrieving from the display buffer previously stored gamma corrected red, green and blue pixel sub-component luminous intensity values; and performing an inverse gamma correction operation on the retrieved gamma corrected red, green and blue pixel sub-component values to generate said background luminous intensity values used in the color blending operation.

9. The method of claim 2, further comprising the step performing a combined color blending and gamma correction operation by using said filtered pixel sub-component alpha values as an index into a combined color blending/gamma correction look-up table which outputs red, green and blue pixel sub-component luminous intensity values.

10. The method of claim 1, wherein the set of alpha values representing a string of glyphs includes alpha values from a first glyph corresponding to a first pixel located along a first side of a glyph boundary, and includes alpha values from a second glyph corresponding to a second pixel located along a second side of said glyph boundary; and wherein the at least one filtered pixel sub-component alpha value generated from alpha values corresponding to two different character glyphs is generated by filtering an alpha value from the first pixel and an alpha value from the second pixel to generate said at least one filtered pixel sub-component alpha value.

11. A machine readable medium, comprising:

computer executable instructions for controlling a computer device to perform the steps of the image data processing method recited in claim 1.

12. A system for processing image data, the system comprising:

means for generating a set of alpha values from a plurality of glyphs, each glyph including a plurality of alpha values; and means for filtering the set of alpha values to generate a set of filtered pixel sub-component alpha values including at least one filtered alpha value for each pixel sub-component used to represent the plurality of glyphs.

13. The system of claim 12, wherein said means for filtering includes means for generating at least one filtered pixel sub-component alpha value from alpha values corresponding to two different character glyphs.

14. The system of claim 12, further comprising:

a glyph cache for storing said plurality of glyphs, each glyph including a number of alpha values, the number of alpha values included in each glyph being greater than the number of pixels used to display the glyph, an output of the glyph cache being coupled to the means for generating a set of alpha values from a plurality of glyphs.

15. The system of claim 14, further comprising:

means for performing a color blending operation using the filtered pixel sub-component alpha values, foreground color information and background color information to generate pixel sub-component luminous intensity values.

16. The system of claim 15, further comprising:

means for performing a gamma correction operation on the generated pixel sub-component luminous intensity values to generate gamma corrected pixel sub-component luminous intensity values.

17. The system of claim of claim 16, further comprising:

a display buffer coupled to the means for performing a gamma correction operation for storing the generated gamma corrected pixel sub-component luminous intensity values; and a display device coupled to the display buffer, the display device including a plurality of pixels, each pixel including a plurality of pixel sub-components.

18. A method of processing character data for display, the method comprising:

sampling representations of character images to generate character glyphs, each character glyph being represented by a plurality of alpha values;

receiving at least two of said character glyphs, each character glyph including alpha values representing a plurality of pixels, each pixel being represented by at least two alpha values, each one of the two alpha values corresponding to a different pixel sub-component of the represented pixel;

combining the received character glyphs to generate a set of alpha values representing a string of characters; and filtering the set of alpha values to generate a set of filtered pixel sub-component alpha values including at least one filtered alpha value for each pixel sub-component used to represent the string of character glyphs, at least one filtered pixel sub-component alpha value being generated from alpha values corresponding to the two different character glyphs.

19. The method of claim 18, wherein each pixel includes three pixel sub-components, a red, a green and a blue pixel sub-component; and wherein the filtering step generates a red, a green and a blue filtered pixel sub-component alpha value for each pixel used to represent the string of characters.

20. The method of claim 19, further comprising:

performing, for each one of a plurality of pixels used to represent the string of characters:

i) a color blending operation using red foreground color information, red background color information, and the red filtered pixel sub-component alpha value corresponding to said one of the plurality of pixels to generate a red luminous intensity value for use in controlling the light output of the red pixel sub-component of said one of the plurality of pixels;

ii) a color blending operation using green foreground color information, green background color information, and the green filtered pixel sub-component alpha value corresponding to said one of the plurality of pixels to generate a green luminous intensity value for use in controlling the light output of the green pixel sub-component of said one of the plurality of pixels; and iii) a color blending operation using blue foreground color information, blue background color information, and the blue filtered pixel sub-component alpha value corresponding to said one of the plurality of pixels to generate a blue luminous intensity value for use in controlling the light output of the blue pixel sub-component of said one of the plurality of pixels.

21. A machine readable medium comprising computer executable instructions for controlling a computer device to perform the steps of the method recited in claim 20.

22. A display method for use with a display device including a plurality of pixels, each pixel including at least two different colored pixel sub-components, the method comprising:

storing a first glyph in a glyph cache, the first glyph including filtered alpha values to be used in controlling the light output of pixels of the display device, at least two alpha values, corresponding to two different pixel sub-components, being stored for each pixel for which alpha value information is stored;

storing a second glyph in the glyph cache, the second glyph including filtered alpha values to be used in controlling the light output of pixels of the display device, at least two alpha values, corresponding to two different pixel sub-components, being stored for each pixel for which alpha value information is stored; and combining, as a function of spacing information, the first and second glyphs to form a multi-glyph image, the step of combining the first and second glyphs including:

summing filtered alpha values from the first and second character glyphs which correspond to overlapping image portions to thereby generate a single alpha value for each overlapped image portion for which alpha values from the first and second glyphs exist.

23. The method of claim 22, wherein the firs and second glyphs are character glyphs, wherein the first character glyph corresponds to a character image which has been padded to include at least a one pixel sub-component wide background color boarder along the left and right vertical edges of the character represented by the character glyph.

24. The method of claim 22, wherein the first and second glyphs are character glyphs, the method further comprising:

padding data representing a first character to provide at least one pixel sub-component width of background colored space along each vertical edge of the represented character thereby producing a first padded character representation;

padding data representing a second character to provide at least one pixel sub-component width of background colored space along each vertical edge of the represented character thereby producing a second padded character representation; and filtering the first and second padded character representations to generate said first and second character glyphs.

25. The method of claim 24, wherein the step of padding data representing a first character includes:

selectively adding data representing a background colored pixel sub-component to each vertical edge of the first character only at points along each vertical edge of the first character where a pixel sub-component width of background colored space does not already exist.

26. The method of claim 25, wherein the step of padding data representing a second character includes the steps of:

selectively adding data representing a background colored pixel sub-component to each vertical edge of the second character only at points along each vertical edge of the first vertical character where a pixel sub-component width of background colored space does not already exist.

27. The method of claim 22, wherein the first and second glyphs are character glyph the method further comprising:

processing data representing a first character to insure at least a one pixel sub-component width of background colored space along each vertical edge of the first character thereby producing a first processed character representation, the processing including padding of the glyph edge as required to insure the one pixel sub-component width of background colored space along each vertical edge of the first character;

processing data representing a second character to insure at least a one pixel sub-component width of background colored space along each vertical edge of the second character thereby producing a second processed character representation, the processing including padding of the glyph edge as required to insure the one pixel sub-component width of background colored space along each vertical edge of the second character; and filtering the first and second processed character representations to generate said first and second character glyphs.

28. The method of claim 27, further comprising:
outputting from the glyph cache, for processing by said combining step, the first and second character glyphs.

29. The method of claim 27, further comprising:
applying color to the multi-glyph image by performing a color blending operation using the filtered alpha values included in the multi-glyph image, foreground color information, and background color information to produce pixel sub-component luminous intensity values.

30. The method of claim 29, wherein each filtered alpha value of the multi-glyph image corresponds to a different pixel sub-component, the step of applying color including:
performing a separate color blending operation for each filtered alpha value of the multi-glyph image to produce red, green and blue pixel sub-component luminous intensity values.

31. The method of claim 30, further comprising the step of performing a gamma correction operation on the generated red, green and blue pixel sub-component luminous intensity values.

32. The method of claim 27, further comprising the step of performing a gamma correction operation on alpha values included in the first and second character glyphs.

33. The method of claim 32, wherein the step of performing a gamma correction operation is performed prior to storage of the first and second character glyphs in the glyph cache.

34. The method of claim 32, wherein the step of performing a gamma correction operation is performed subsequent to storage of the first and second character glyphs in the glyph cache.

35. The method of claim 26,
wherein the step of storing a first glyph includes the steps of:
i) compressing filtered alpha values corresponding to different pixel sub-components of a pixel into a compressed value, thereby generating a compressed value for each pixel; and
ii) storing the generated compressed values in the glyph cache; and
wherein the method further includes outputting from the glyph cache, for processing by said combining step, the first character glyph, the step of outputting the first character glyph includes the step of decompressing the stored compressed values corresponding to the first character glyph.

36. A processing device for use with a display device including a plurality of pixels, each pixel including at least two different colored pixel sub-components, the processing device comprising:
a glyph cache;
means for storing a first glyph in the glyph cache, the first glyph including filtered alpha values to be used in controlling the light output of pixels of the display device, at least two alpha values, corresponding to two different pixel sub-components, being stored for each pixel for which alpha value information is stored; and
means for storing a second glyph in the glyph cache, the second glyph including filtered alpha values to be used in controlling the light output of pixels of the display device, at least two alpha values, corresponding to two different pixel sub-components, being stored for each pixel for which alpha value information is stored.

37. The device of claim 36, further comprising:
means for processing the first and second glyphs to form a multi-glyph image, the processing means including circuitry for combining filtered alpha values from the first and second character glyphs which correspond to overlapping image portions to thereby generate a single alpha value for each overlapped image portion for which filtered alpha values from the first and second glyphs exist.

38. The device of claim 36, wherein said circuitry for combining filtered alpha values includes summing circuitry included in a processor.

39. The device of claim 38, wherein the first and second glyphs are character glyphs, the device further comprising:
means for processing data representing a first character to ensure at least a one pixel sub-component width of background colored space along each vertical edge of the first character thereby producing a first processed character representation, the processing including padding of the glyph edge as required to insure the one pixel sub-component width of background colored space along each vertical edge of the first character;
means for processing data representing a second character to ensure at least a one pixel sub-component width of background colored space along each vertical edge of the second character thereby producing a second processed character representation, the processing including padding of the glyph edge as required to insure the one pixel sub-component width of background colored space along each vertical edge of the second character; and
a filter for filtering the first and second processed character representations to generate said first and second character glyphs.

40. The processing device of claim 36, wherein the first and second glyphs are character glyphs, the processing device further comprising:
means for padding data representing a first character to provide at least one pixel sub-component width of background colored space along each vertical edge of the represented character thereby producing a first padded character representation;
means for padding data representing a second character to provide at least one pixel sub-component width of background colored space along each vertical edge of the represented character thereby producing a second padded character representation; and
a filter for filtering the first and second padded character representations to generate said first and second character glyphs.

41. A method of processing images for display on a color display device including a plurality of pixels, each pixel including a plurality of pixel sub-components, the method comprising:
processing data representing a first character to insure at least a one pixel sub-component width of background colored space along each vertical edge of the represented character thereby producing a first processed character representation;
processing data representing a second character to insure at least a one pixel sub-component width of background colored space along each vertical edge of the represented character thereby producing a second processed character representation;
filtering the first and second processed character representations to generate first and second character glyphs including a plurality of alpha values; and combining the first and second character glyphs to form a multi-glyph image, the step of combining the first and second character glyphs including the step of:

processing alpha values from the first and second character glyphs which correspond to overlapping image portions to thereby generate a single alpha value for each overlapped image portion for which alpha values from the first and second character glyphs exist.

42. The method of claim 41, wherein the step of processing alpha values from the first and second character glyphs which correspond to overlapping image portions includes the step of summing filtered alpha values corresponding to overlapping image portions.

43. The method of claim 41 further comprising:

performing a data compression on the alpha values included in the first and second character glyphs;

storing the first and second character glyphs in a glyph cache;

outputting the first and second character glyphs from the glyph cache;

performing a data decompression operation on the first and second character glyphs to thereby restore the alpha values included therein to an uncompressed form; and supplying the first and second character glyphs resulting from performing the data decompression operation to said step of combining the first and second character glyphs.

44. A machine readable medium comprising computer executable instructions for controlling a computer device to perform the steps of the method recited in claim 41.

45. A method of processing image data, comprising:

sampling an image to generate a plurality of alpha values;

filtering the alpha values to generate multiple filtered alpha values per pixel; and storing the filtered alpha values in a glyph cache as part of a character glyph.

46. The method of claim of claim 45, wherein the filtering step includes:

generating each filtered alpha value, from multiple alpha values generated by said sampling, one filtered alpha value being generated for each pixel sub-component of a pixel.

47. The method of claim 46, herein the step of filtering the alpha value includes the step of:

performing a filter look-up table operation.

48. The method of claim 46, wherein the step of storing the alpha values in the glyph cache includes the step of:

compressing the multiple filtered alpha values generated for each pixel into a single compressed value; and storing the single compressed value generated for each pixel in the glyph cache.

49. The method of claim 45, wherein each pixel used to represent said image includes a red, green and blue pixel sub-component; and wherein the filtering step includes the step of using alpha values generated from different portions of said image to generate each one of said filtered alpha values, three alpha values being generated per pixel.

50. The method of claim 48, further comprising:

receiving character glyphs from the glyph cache;

combining the character glyphs to form multi-glyph images, the step of combining the character glyphs including the step of:

processing multiple filtered alpha values corresponding to the same pixel sub-component of the multi-glyph image, to generate one filtered alpha value per pixel sub-component of the multi-glyph image, said multiple filtered alpha values corresponding to the same pixel sub-component resulting from overlapping glyph edges.

51. The method of claim 50, wherein the step of processing multiple filtered alpha values includes the step of summing filtered alpha values corresponding to the same pixel sub-component to produce a single filtered alpha value corresponding to said same pixel sub-component.

52. A method of processing image data, comprising the steps of:

sampling an image to produce a plurality of alpha values;

storing a glyph including the plurality of alpha values in a glyph cache;

receiving from the glyph cache the glyph; and filtering the plurality of alpha values included in the glyph to produce multiple filtered alpha values per pixel.

53. The method of claim 52, wherein the filtering produces at least one filtered alpha value for each pixel sub-component of a pixel including red, green and blue pixel sub-components.

54. The method of claim 52, wherein a pixel includes a red, a green and a blue pixel sub-component; and wherein the filtering produces a red, a green and a blue filtered pixel sub-component alpha value for each pixel used to represent said image.

55. A method of processing image data, comprising:

sampling an image to generate a plurality of alpha values;

filtering the alpha values to generate a single compressed value per pixel; and storing the single compressed value for each pixel in a glyph cache;

receiving the stored compressed values stored in the glyph cache; and decompressing the compressed values to produce a plurality of filtered alpha values per pixel.

56. The method of claim 55, wherein the filtering step includes the act of:

using a look-up table to generate a single compressed value per pixel from multiple alpha values.

* * * * *